United States Patent
Sato et al.

(10) Patent No.: US 6,656,538 B2
(45) Date of Patent: Dec. 2, 2003

(54) METHOD OF MANUFACTURING MAGNETORESISTIVE DEVICE, METHOD OF MANUFACTURING THIN FILM MAGNETIC HEAD, AND METHOD OF FORMING THIN FILM PATTERN

(75) Inventors: Kazuki Sato, Tokyo (JP); Noriaki Kasahara, Tokyo (JP); Naoki Ohta, Tokyo (JP)

(73) Assignee: TDK Corporation, Tokyo (JP)

( * ) Notice: Subject to any disclaimer, the term of this patent is extended or adjusted under 35 U.S.C. 154(b) by 29 days.

(21) Appl. No.: 10/272,860

(22) Filed: Oct. 18, 2002

(65) Prior Publication Data

US 2003/0082484 A1 May 1, 2003

(30) Foreign Application Priority Data

Oct. 30, 2001 (JP) ........................................ 2001-332905

(51) Int. Cl.$^7$ ................................................. B05D 3/00
(52) U.S. Cl. ...................... 427/552; 427/130; 427/131; 427/331; 427/402; 427/261; 427/264; 427/271; 427/595
(58) Field of Search ................................. 427/552, 130, 427/131, 331, 402, 261, 264, 271, 595

(56) References Cited

FOREIGN PATENT DOCUMENTS

JP       A 2001-006128         1/2001

OTHER PUBLICATIONS

U.S. patent application Ser. No. 09/592,291, Barada et al., filed Jun. 12, 2000.

*Primary Examiner*—Bernard Pianalto
(74) *Attorney, Agent, or Firm*—Oliff & Berridge, PLC

(57) ABSTRACT

Provided are a method of manufacturing a magnetoresistive device and a method of manufacturing a thin film magnetic head capable of efficiently forming a magnetoresistive device having an extremely small magnetoresistive film pattern, and capable of reducing variations in dimensions of the magnetoresistive film pattern. Further, provided is a method of forming a thin film pattern capable of efficiently forming a plurality of thin film patterns with different sizes on a same base with accuracy according to the thin film patterns. Electron beam lithography or photolithography is selectively used according to the sizes of patterns to be formed, so while the dimensional accuracy of a portion specifically requiring higher accuracy can be secured, the patterns can be efficiently formed.

14 Claims, 24 Drawing Sheets

20A

110

51

20A  110

FIG. 11A
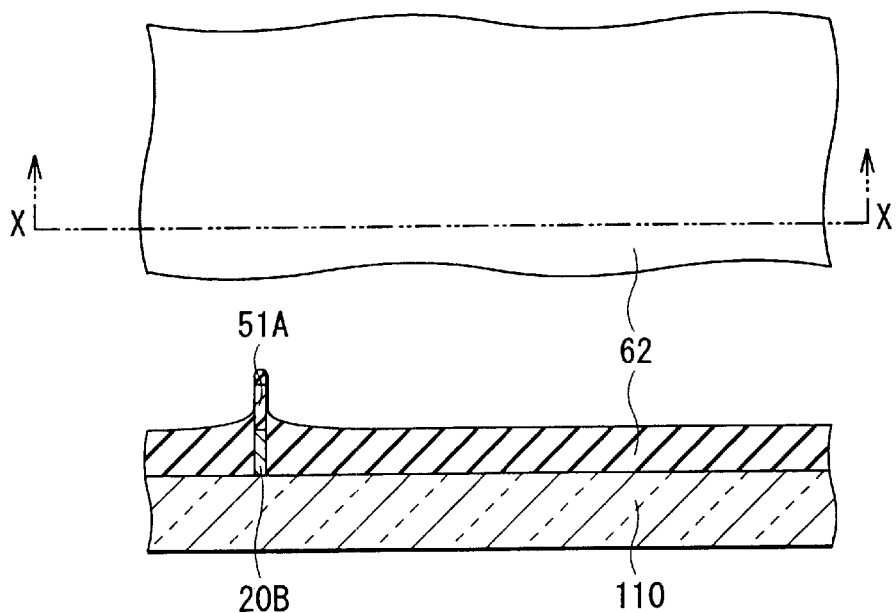
FIG. 11B
FIG. 12A
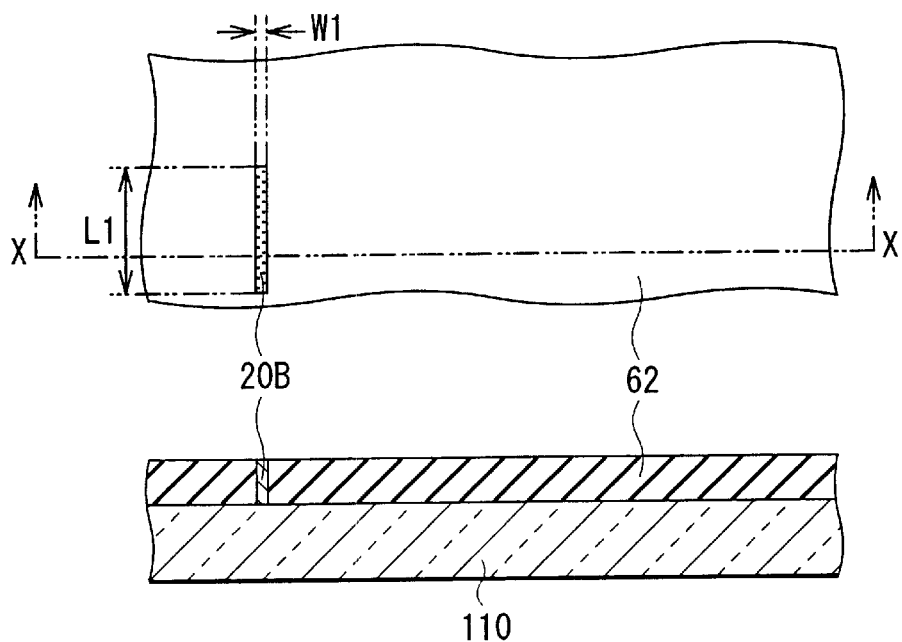
FIG. 12B

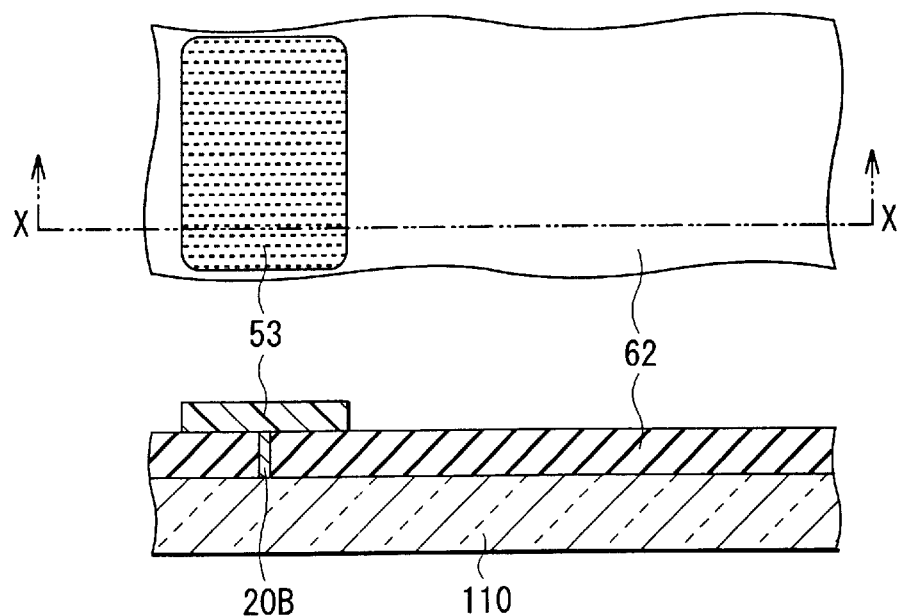
FIG. 13A
FIG. 13B
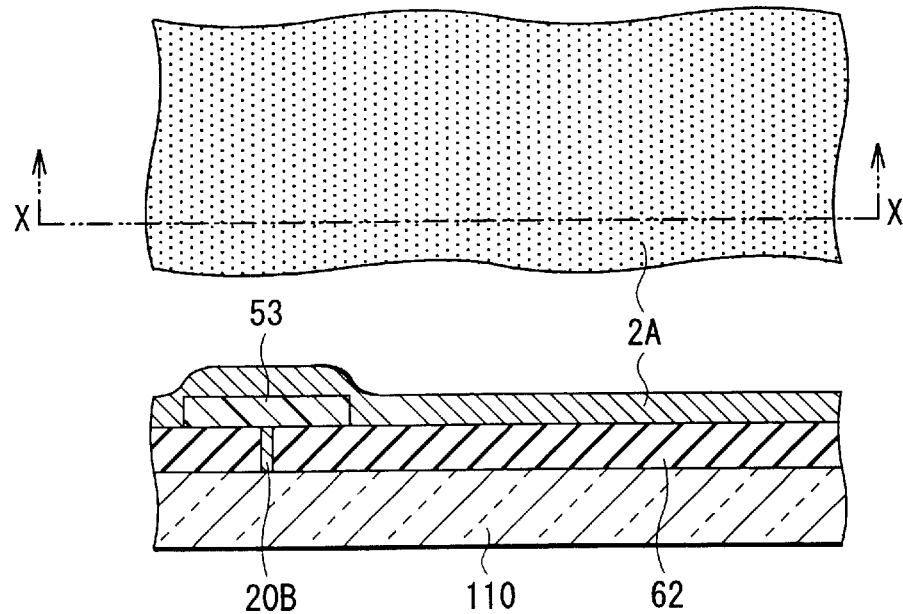
FIG. 14A
FIG. 14B

FIG. 15A
FIG. 15B
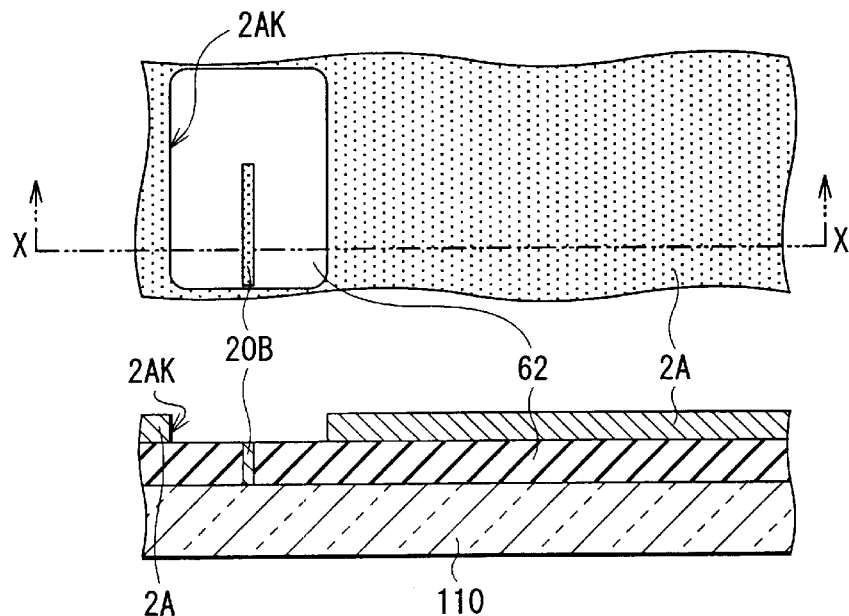
FIG. 16A
FIG. 16B
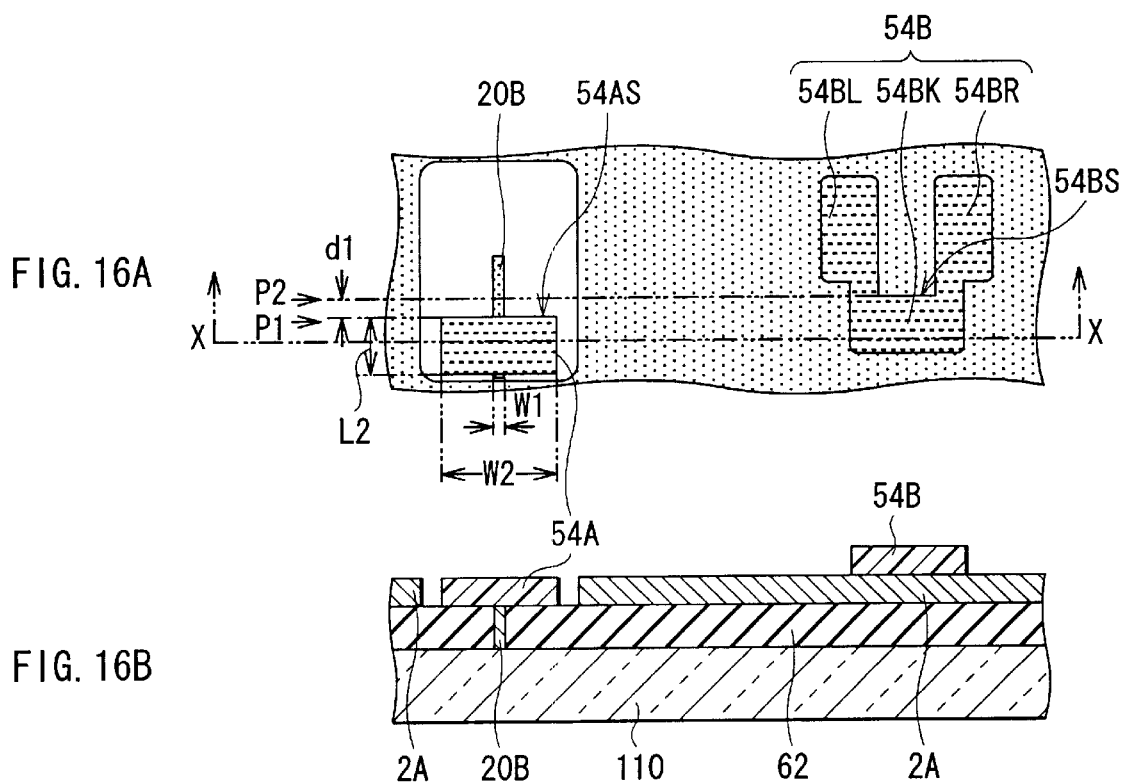

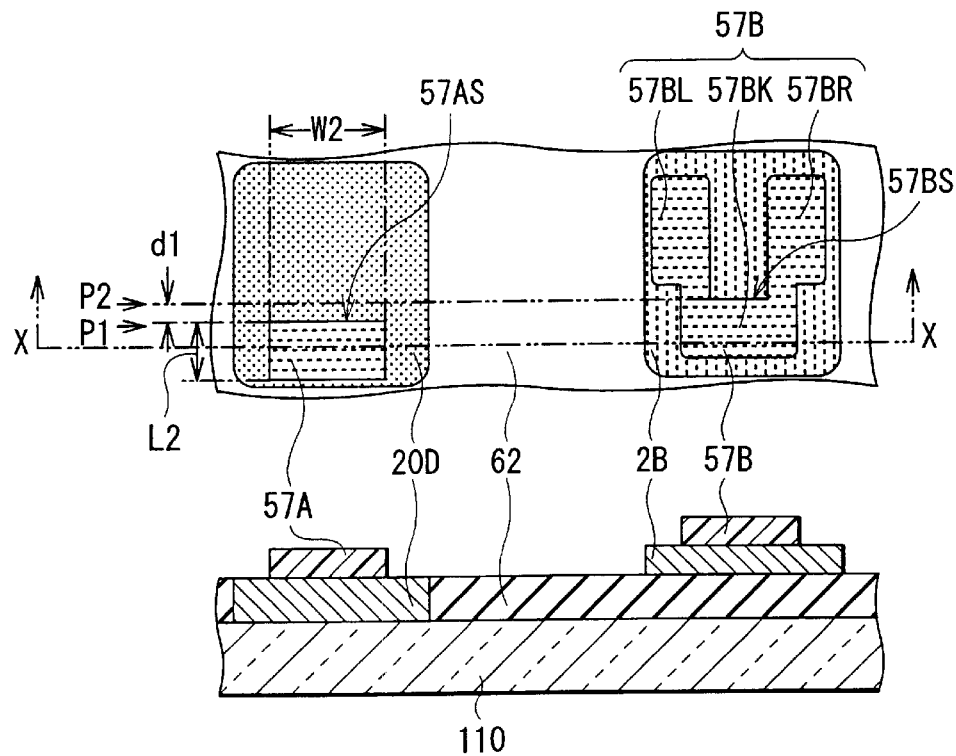
FIG. 29A
FIG. 29B
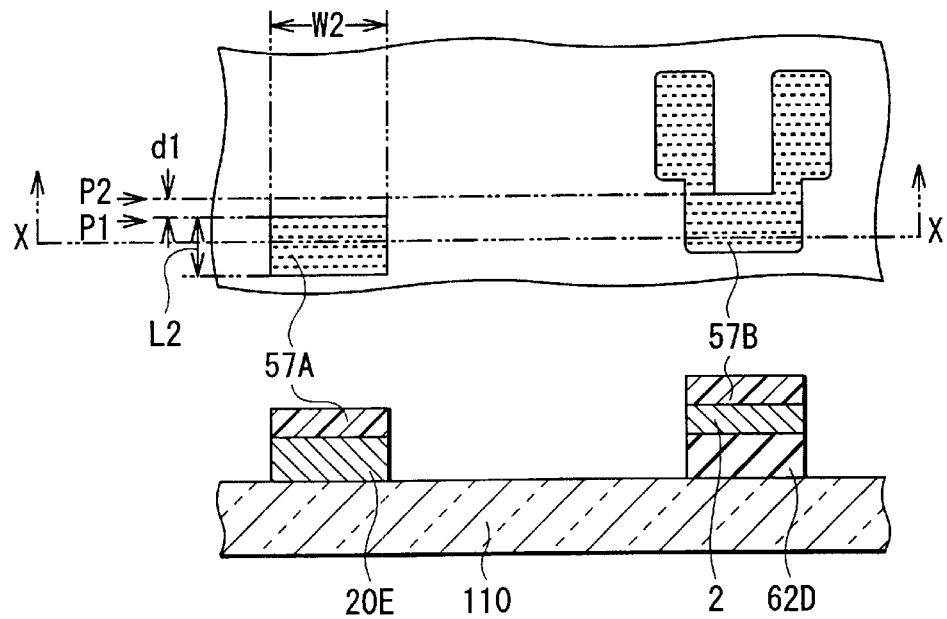
FIG. 30A
FIG. 30B

FIG. 31A
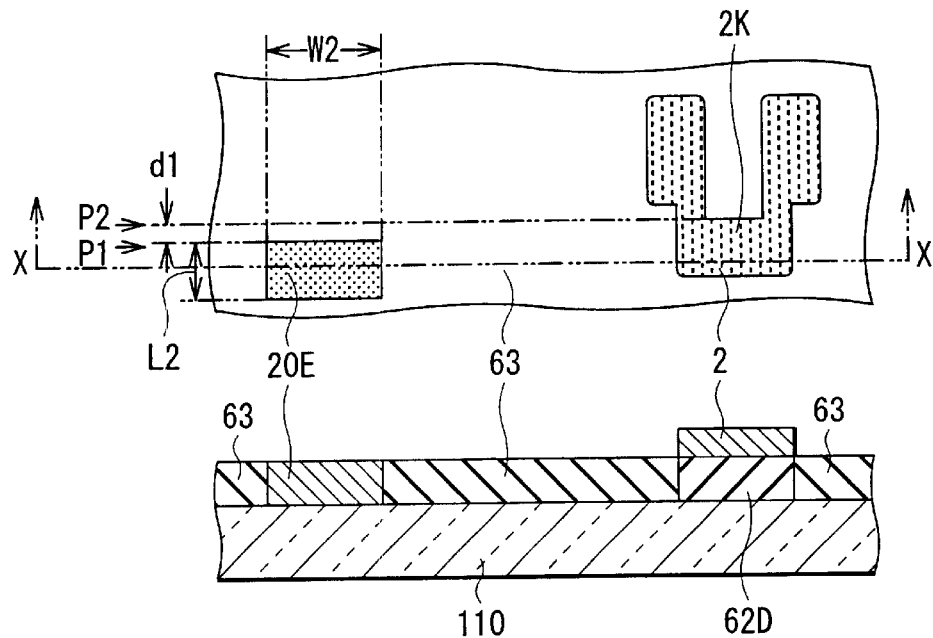
FIG. 31B
FIG. 32A
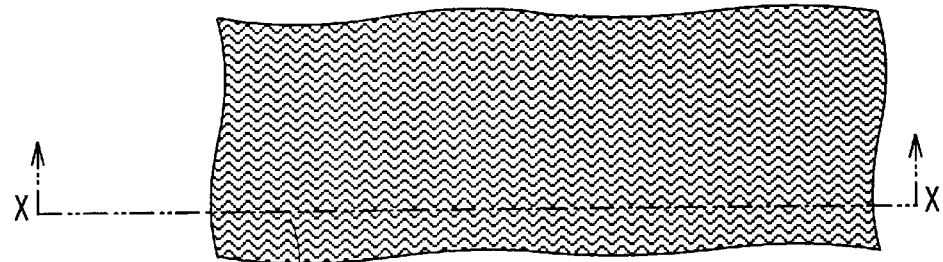
FIG. 32B

FIG. 33A
FIG. 33B
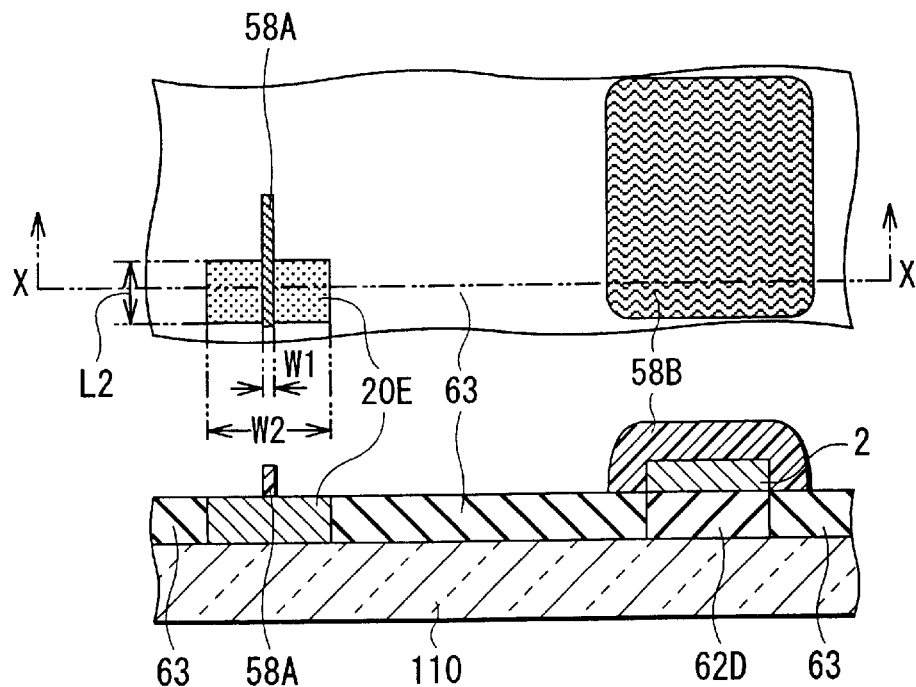
FIG. 34A
FIG. 34B
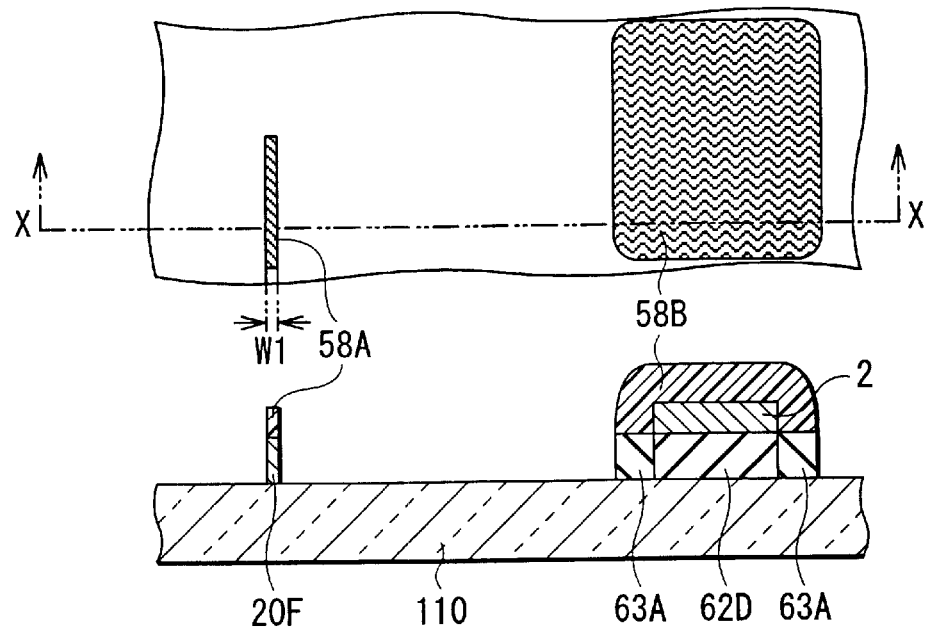

FIG. 35A
FIG. 35B
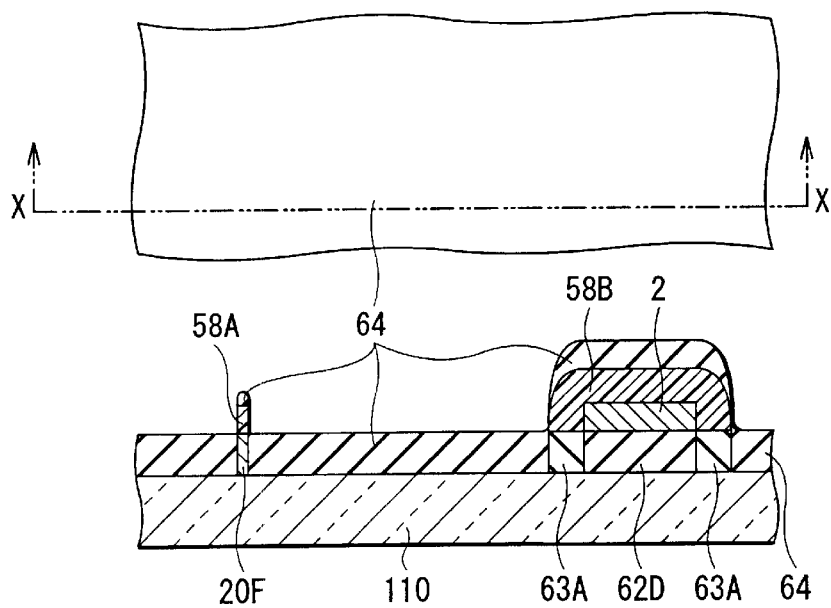
FIG. 36A
FIG. 36B
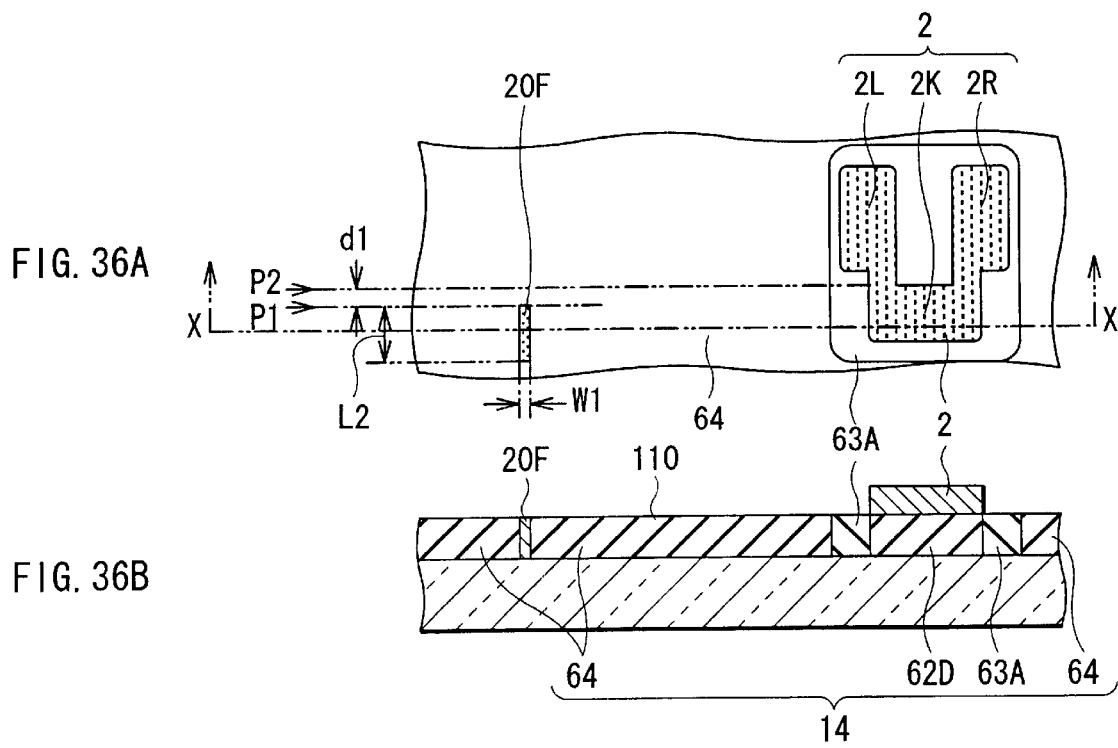

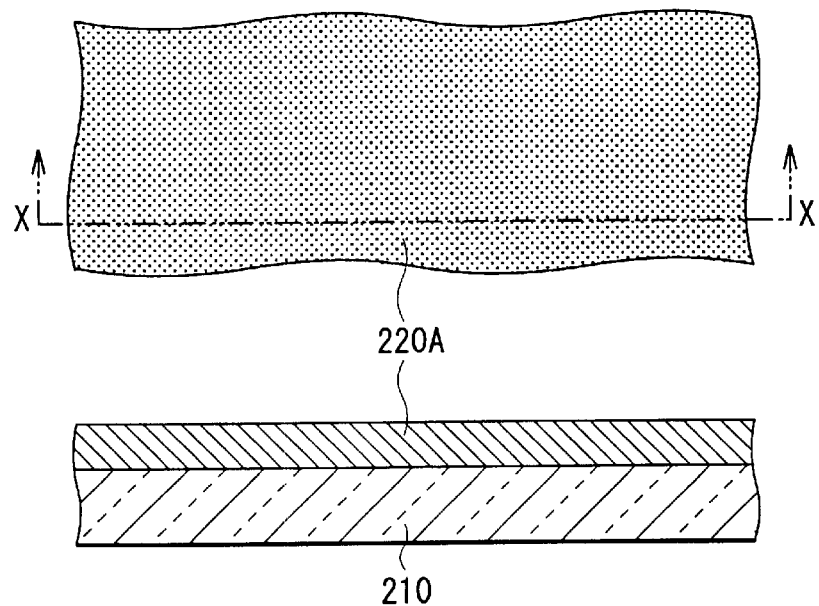
FIG. 37A
RELATED ART
FIG. 37B
RELATED ART
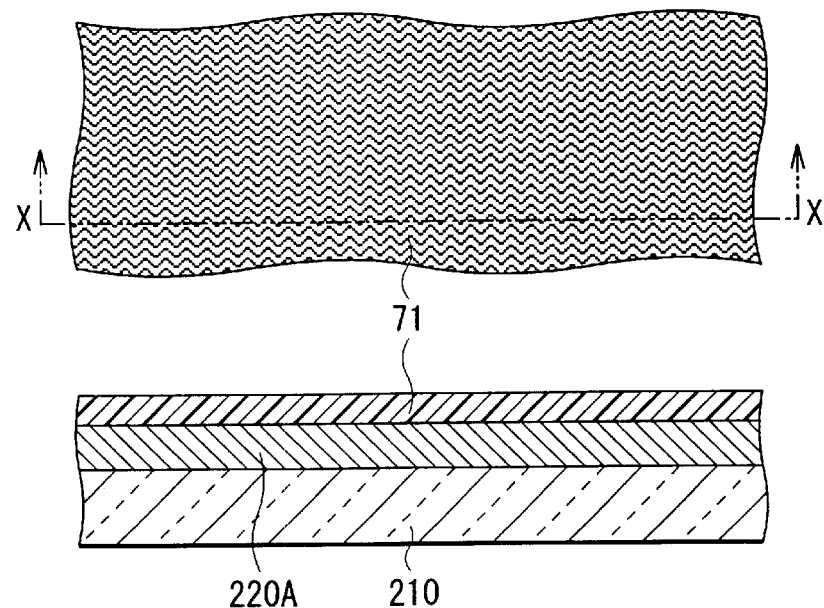
FIG. 38A
RELATED ART
FIG. 38B
RELATED ART

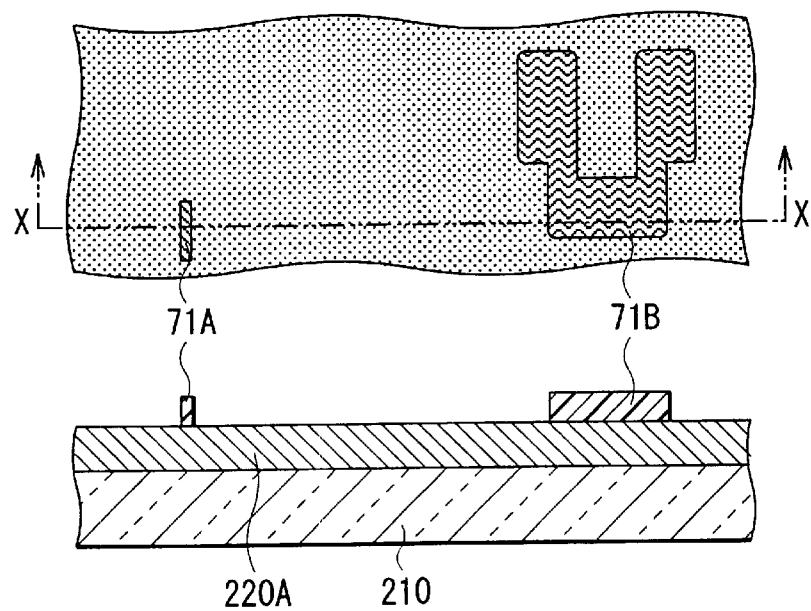
FIG. 39A RELATED ART
FIG. 39B RELATED ART
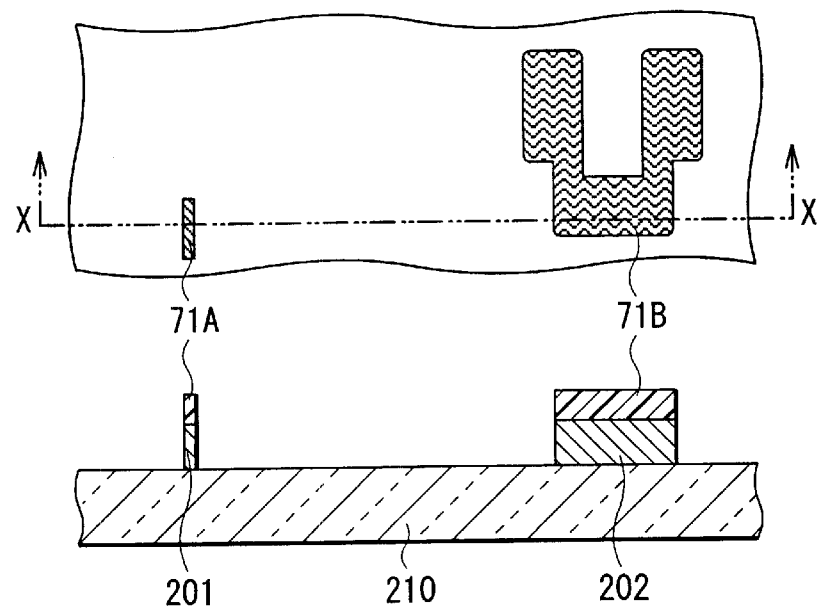
FIG. 40A RELATED ART
FIG. 40B RELATED ART

METHOD OF MANUFACTURING MAGNETORESISTIVE DEVICE, METHOD OF MANUFACTURING THIN FILM MAGNETIC HEAD, AND METHOD OF FORMING THIN FILM PATTERN

BACKGROUND OF THE INVENTION

1. Field of the Invention

The present invention relates to a method of manufacturing a magnetoresistive device including a magnetoresistive film pattern with a predetermined shape, a method of manufacturing a thin film magnetic head including such a magnetoresistive device disposed on a base, and a method of forming two or more thin film patterns with different sizes on a same base.

2. Description of the Related Art

In recent years, an improvement in performance of thin film magnetic heads has been sought in accordance with an increase in areal recording density of hard disk drives or the like. A magnetoresistive (hereinafter referred to as MR) head (MR head) including a MR device which is one of magnetic transducers is widely and commonly used as a reproducing head portion in the thin film magnetic head.

The examples of the MR device include anisotropic magnetoresistive (hereinafter referred to as AMR) devices using a magnetic film (AMR film) exhibiting an AMR effect, giant magnetoresistive (hereinafter referred to as GMR) devices using a magnetic film (GMR film) exhibiting a GMR effect and so on. A typical GMR device is a spin valve type GMR device, and the thin film magnetic head with a reproducing head portion using the spin valve type GMR device has been widely put to practical use.

Recently, the development of tunneling magnetoresistive (hereinafter referred to as TMR) devices which have higher reproduction performance as compared with the spin valve type GMR devices, that is, can obtain a higher magnetoresistive ratio has been advanced. Signals stored in a recording medium having a smaller track width for high density recording can be reproduced by use of the TMR device.

In order to reduce variations in the reproduction performance of the MR head, it is required to reduce variations specifically in the dimensional accuracy of a MR height during patterning of the MR film. The MR height is a length (height) from an end on the side of a surface of the MR device facing the recording medium (air bearing surface) to the other end, and a polishing amount during processing of the air bearing surface determines the MR height.

Regarding the MR height, the applicant of the present invention has proposed a method of manufacturing a MR device capable of reducing variations in electromagnetic properties of the completed MR device and changes in the center of a distribution in electromagnetic properties of the completed MR device, and meeting predetermined specifications for magnetic reproduction in, for example, Japanese Unexamined Patent Application Publication No. 2001-006128. The method comprises the following steps.

First of all, a plurality of MR heads as well as a plurality of dummy resistive films which are thin film structures are formed on a base made of a material such as a ceramic, for example, through photolithography or the like. Then, the base is cut by use of a dicing saw or the like to form a plurality of bars each comprising a plurality of MR heads and a plurality of dummy resistive films.

Next, the plurality of bars obtained through the above step are set on a polishing apparatus or the like to mechanically polish their cut surfaces, that is, their air bearing surfaces. Mechanically polishing is not carried out while monitoring the dimension of the MR height, but while monitoring the electrical resistance of the dummy resistive films which have been already formed, in advance, on the bars. When the electrical resistance reaches a predetermined value, the polishing is stopped.

According to the above method, the processing accuracy of the MR height can be controlled, and variations in the properties of the MR device can be reduced to a certain point.

However, at present, a demand for higher density recording of hard disks, etc. has been further increased. Therefore, the adoption of a MR device using a MR film with higher sensitivity such as a TMR film has been studied, and a process of more accurately forming the dimension of the MR device applicable to a very small track width in the width direction has been in demand. It is difficult to satisfy the demands through patterning by use of the conventional photolithography, so the applicant of the invention has been pursuing the study of a method of patterning by use of electron beam (hereinafter referred to as EB) lithography.

Referring to FIGS. 37A through 42B, a method of forming a pattern when EB lithography is used in a method of manufacturing the MR device is described below. FIGS. 37A, 38A, 39A, 40A, 41A and 42A show plan views, and FIGS. 37B, 38B, 39B, 40B, 41B and 42B show cross sectional views taken along the line x—x. As shown in FIGS. 37A and 37B, first of all, a multilayer film 220A is formed through sputtering or the like on a base 210 on which an insulating layer (not shown) is disposed. Then, as shown in FIGS. 38A and 38B, an EB resist film 71 is formed on the multilayer film 220A. Next, as shown in FIGS. 39A and 39B, EB resist patterns 71A and 71B are selectively formed through EB lithography. The EB lithography is carried out through scanning areas where the patterns are formed while irradiating with an electron beam. After that, as shown in FIGS. 40A and 40B, the multilayer film 220A is selectively etched by use of the EB resist patterns 71A$n$ and 71B as masks through, for example, ion milling. Thereby, a MR film pattern 201 and a dummy resistive film pattern 202 are formed. Then, an insulating layer 72 is formed all over the area as shown in FIGS. 41A and 41B. After that, as shown in FIGS. 42A and 42B, the remained EB resist patterns 71A and 71B are removed through lift off processing, then the MR film pattern 201 and the dummy resistive film pattern 202 both having a predetermined planer shape and a predetermined size can be obtained.

Thus, by use of EB lithography, compared with the conventional photolithography, the MR film pattern 201 having a smaller dimension in the width direction can be accurately formed. However, on the other hand, much time is required to form the relatively large dummy resistive film pattern 202, resulting in worse throughput in the manufacturing process.

Moreover, relative displacement between the MR film pattern and the dummy resistive film pattern occurs due to the electrical charge on the base on which the patterns are formed. When the base carries an electrical charge unevenly depending upon areas, the electron beam is deflected at a rate depending upon areas on the base, thereby resulting in the occurrence of the relative displacement. As the electrical charge in this case varies depending upon areas on the same base as well as individual bases, the amount of the relative displacement varies, which leads variations in the relative displacement in the base as well as among the bases.

Therefore, variations in dimensions occur when processing the MR height through mechanically polishing, thereby variations in the reproduction output of the MR head become larger.

SUMMARY OF THE INVENTION

In view of the foregoing, it is a first object of the present invention to provide a method of manufacturing a magnetoresistive device and a method of manufacturing a thin film magnetic head capable of efficiently forming a magnetoresistive device having an extremely small magnetoresistive film pattern.

It is a second object of the invention to provide a method of manufacturing a magnetoresistive device and a method of manufacturing a thin film magnetic head capable of reducing variations in dimensions of a magnetoresistive film pattern.

It is a third object of the invention to provide a method of forming a thin film pattern, and more specifically efficiently forming a plurality of thin film patterns with different sizes on a same base with accuracy according to each of the plurality of thin film patterns.

In a method of manufacturing a magnetoresistive device according to the invention, the magnetoresistive device includes a magnetoresistive film pattern with a predetermined shape, and the method comprises: a first step of forming a magnetoresistive film on a base; a second step of patterning the magnetoresistive film through at least electron beam lithography to form the magnetoresistive film pattern; a third step of forming a dummy resistive film on the base; and a fourth step of patterning the dummy resistive film through photolithography to form a dummy resistive film pattern used for reprocessing the magnetoresistive film pattern.

In a method of manufacturing a magnetoresistive device according to the invention, the magnetoresistive film formed on the base is patterned through at least electron beam lithography to form the magnetoresistive film pattern with a predetermined shape. On the other hand, the dummy resistive film formed on the base is patterned through photolithography to form the dummy resistive film pattern used for reprocessing the magnetoresistive film pattern. Electron beam lithography which selectively performs exposures by use of an electron beam in such a way as to draw lines allows more accurate patterning, compared with photolithography which selectively performs exposures by use of light, so at least a portion of the magnetoresistive film pattern where electron beam lithography is carried out can be patterned with higher accuracy, compared with the dummy resistive film pattern.

When the dummy resistive film pattern is larger in size than the magnetoresistive film pattern, a method of manufacturing a magnetoresistive device according to the invention is more preferably applicable. In this case, while the magnetoresistive film pattern with a smaller size is formed through electron beam lithography requiring a relatively long time for exposures, the dummy resistive film pattern with a larger size is formed through photolithography requiring a relatively short time. Therefore, according to the method, compared with the case where both of the patterns are formed through electron beam lithography, a time required for lithography can be reduced. On the other hand, compared with the case where both of the patterns are formed through photolithography, the forming accuracy of the magnetoresistive film pattern with a smaller size can be specifically improved.

When the magnetoresistive film pattern includes a first outline and a second outline, and the second outline requires higher processing accuracy than the first outline or has a smaller size than the first outline, a method of manufacturing a magnetoresistive device according to the invention is preferably applicable. In this case, while the first outline is formed through photolithography, the second outline is formed through electron beam lithography. Therefore, according to the method, electron beam lithography which is superior in patterning accuracy is used only for an outline specifically requiring higher processing accuracy, and photolithography is used for other outlines. Thereby, compared with the case where the whole magnetoresistive film pattern is formed through electron beam lithography, a time required for lithography can be further reduced.

In a method of manufacturing a magnetoresistive device according to the invention, it is preferable that the step of forming the first outline of the magnetoresistive film pattern and the fourth step are concurrently carried out. In this case, the first outline and the dummy resistive film pattern are concurrently formed through photolithography, so compared with the case where they are separately formed through photolithography, relative displacement between the first outline of the magnetoresistive film pattern and the dummy resistive film pattern can be reduced.

In a method of manufacturing a thin film magnetic head according to the invention, the thin film magnetic head includes a magnetoresistive device having a magnetoresistive film pattern with a predetermined shape disposed on a base, and the method comprises: a first step of forming a magnetoresistive film on the base; a second step of patterning the magnetoresistive film through at least electron beam lithography to form the magnetoresistive film pattern; a third step of forming a dummy resistive film on the base; a fourth step of patterning the dummy resistive film through photolithography to form a dummy resistive film pattern; and a fifth step of polishing a side surface of the base as well as an end surface of the magnetoresistive film pattern and an end surface of the dummy resistive film pattern to form a recording-medium-facing surface facing a recording medium, wherein the amount of polishing in the fifth step is controlled based on electrical resistance of the dummy resistive film pattern.

In a method of manufacturing a thin film magnetic head according to the invention, like the above-described method of manufacturing a magnetoresistive device, while the magnetoresistive film pattern is formed on the base through at least electron beam lithography, the dummy resistive film pattern is formed on the base through photolithography. As described above, electron beam lithography allows more accurate patterning, compared with photolithography, so a portion of the magnetoresistive film pattern where electron beam lithography is carried out can be patterned with higher accuracy, compared with the dummy resistive film pattern. Further, the end face of the magnetoresistive film pattern together with the side surface of the base are polished under the control based on the electrical resistance of the dummy resistive film pattern to form a completed recording-medium-facing surface. In other words, the magnetoresistive film pattern including at least a portion patterned with high accuracy is reprocessed (polished) so that a final dimension (height dimension) of the magnetoresistive film pattern in the direction orthogonal to the recording-medium-facing surface is controlled so as to become a predetermined value.

When the magnetoresistive film pattern has a strip shape determined by a dimension in the width direction defining a recording track width of a recording medium and a dimension in the height direction orthogonal to the width direction, and the dimension in the height direction is larger than the dimension in the width direction, a method of manufacturing a thin film magnetic head according to the invention is more preferably applicable. In this case, the dimension in the height direction is determined by patterning through photolithography, and the dimension in the width direction is determined by patterning through electron beam lithography. In other words, when determining the dimension in the height direction, photolithography is used, and when determining the dimension in the width direction which requires specifically high processing accuracy, electron beam lithography superior in lithography accuracy is used. Therefore, compared with the case where the whole magnetoresistive film pattern is formed through electron beam lithography, a time required for lithography can be further reduced.

In a method of manufacturing a thin film magnetic head according to the invention, it is preferable that a step of determining the dimension of the magnetoresistive film pattern in the height direction and the fourth step are concurrently carried out. In this case, a portion determining the dimension of the magnetoresistive film pattern in the height direction and the dummy resistive film pattern are concurrently formed through photolithography. Therefore, compared with the case where they are separately formed through photolithography, the relative displacement between the magnetoresistive film pattern and the dummy resistive film pattern can be reduced.

A method of forming a thin film pattern according to the invention comprises the steps of: forming a first thin film pattern on a base through at least electron beam lithography; and forming a second thin film pattern on the base through photolithography, the second thin film pattern being larger than the first thin film pattern.

In a method of forming a thin film pattern according to the invention, while the first thin film pattern with a smaller size is formed though electron beam lithography requiring a relatively long time for exposures, the second thin film pattern with a larger size is formed through photolithography requiring a relatively short time. Therefore, according to the manufacturing method, compared with the case where both of the patterns are formed through only electron beam lithography, a time required for lithography can be reduced. On the other hand, compared with the case where both of the patterns are formed through only photolithography, the forming accuracy of the first thin film pattern with a smaller size can be specifically improved.

Other and further objects, features and advantages of the invention will appear more fully from the following description.

BRIEF DESCRIPTION OF THE DRAWINGS

FIGS. 11A and 11B are a plan view and a cross sectional view for describing a step following the step of FIGS. 10A and 10B;

FIGS. 12A and 12B are a plan view and a cross sectional view for describing a step following the step of FIGS. 11A and 11B;

FIGS. 13A and 13B are a plan view and a cross sectional view for describing a step following the step of FIGS. 12A and 12B;

FIGS. 14A and 14B are a plan view and a cross sectional view for describing a step following the step of FIGS. 13A and 13B;

FIGS. 15A and 15B are a plan view and a cross sectional view for describing a step following the step of FIGS. 14A and 14B;

FIGS. 16A and 16B are a plan view and a cross sectional view for describing a step following the step of FIGS. 15A and 15B;

FIGS. 29A and 29B are a plan view and a cross sectional view for describing a step following the step of FIGS. 28A and 28B;

FIGS. 30A and 30B are a plan view and a cross sectional view for describing a step following the step of FIGS. 29A and 29B;

FIGS. 31A and 31B are a plan view and a cross sectional view for describing a step following the step of FIGS. 30A and 30B;

FIGS. 32A and 32B are a plan view and a cross sectional view for describing a step following the step of FIGS. 31A and 31B;

FIGS. 33A and 33B are a plan view and a cross sectional view for describing a step following the step of FIGS. 32A and 32B;

FIGS. 34A and 34B are a plan view and a cross sectional view for describing a step following the step of FIGS. 33A and 33B;

FIGS. 35A and 35B are a plan view and a cross sectional view for describing a step following the step of FIGS. 34A and 34B;

FIGS. 36A and 36B are a plan view and a cross sectional view for describing a step following the step of FIGS. 35A and 35B;

FIGS. 37A and 37B are a plan view and a cross sectional view for describing a step of a method of manufacturing a conventional thin film magnetic head;

FIGS. 38A and 38B are a plan view and a cross sectional view for describing a step following the step of FIGS. 37A and 37B;

FIGS. 39A and 39B are a plan view and a cross sectional view for describing a step following the step of FIGS. 38A and 38B;

FIGS. 40A and 40B are a plan view and a cross sectional view for describing a step following the step of FIGS. 39A and 39B;

DETAILED DESCRIPTION OF THE PREFERRED EMBODIMENTS

Preferred embodiments of the present invention are described in more detail below referring to the accompanying drawings.

[First Embodiment]

<Structure of thin film magnetic head>

A method of manufacturing a magnetoresistive device and a method of manufacturing a thin film magnetic head according to an embodiment of the invention are described below. First of all, the structure of the thin film magnetic head is described.

Figure 1:
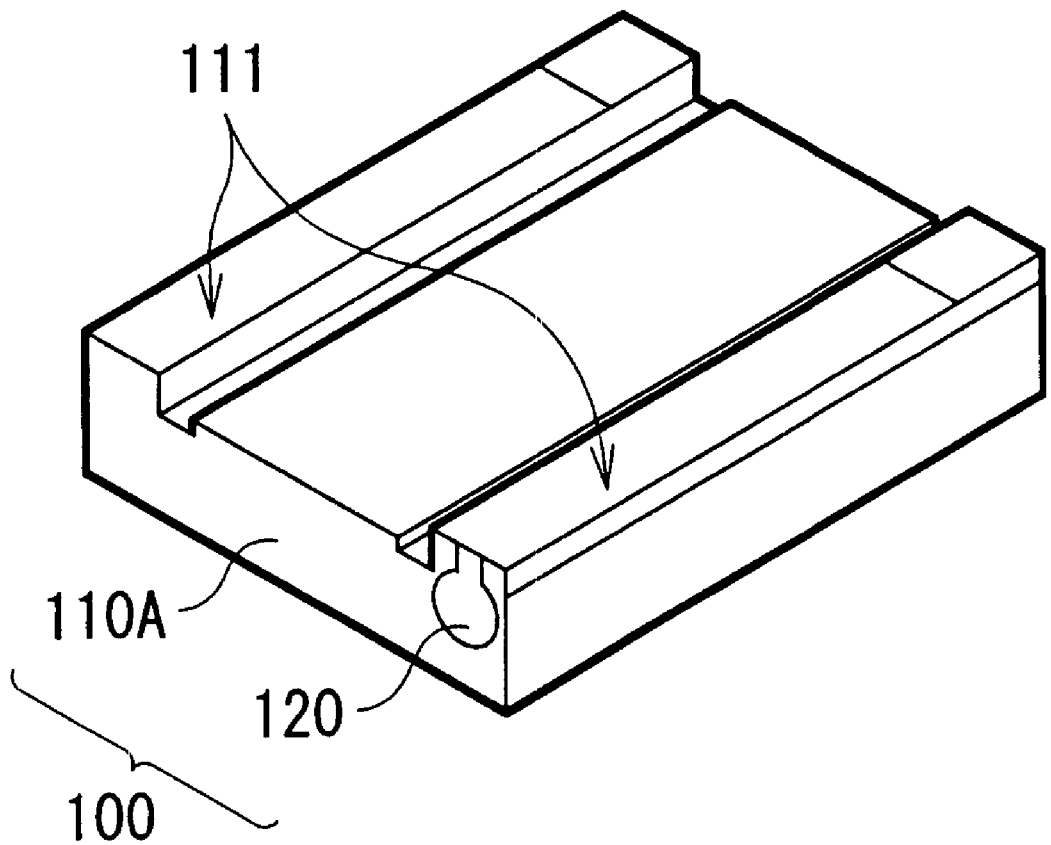
FIG. 1 is a perspective view for describing the structure of a magnetic head slider comprising a thin film magnetic head according to an embodiment of the invention.

FIG. 1 shows the structure of a slider comprising a thin film magnetic head 120 according to the embodiment. The slider has a substantially rectangular shape. The magnetic head 120 is formed on a side surface orthogonal to a recording-medium-facing surface (air bearing surface) 111 in a slider body 100.

Figure 2:
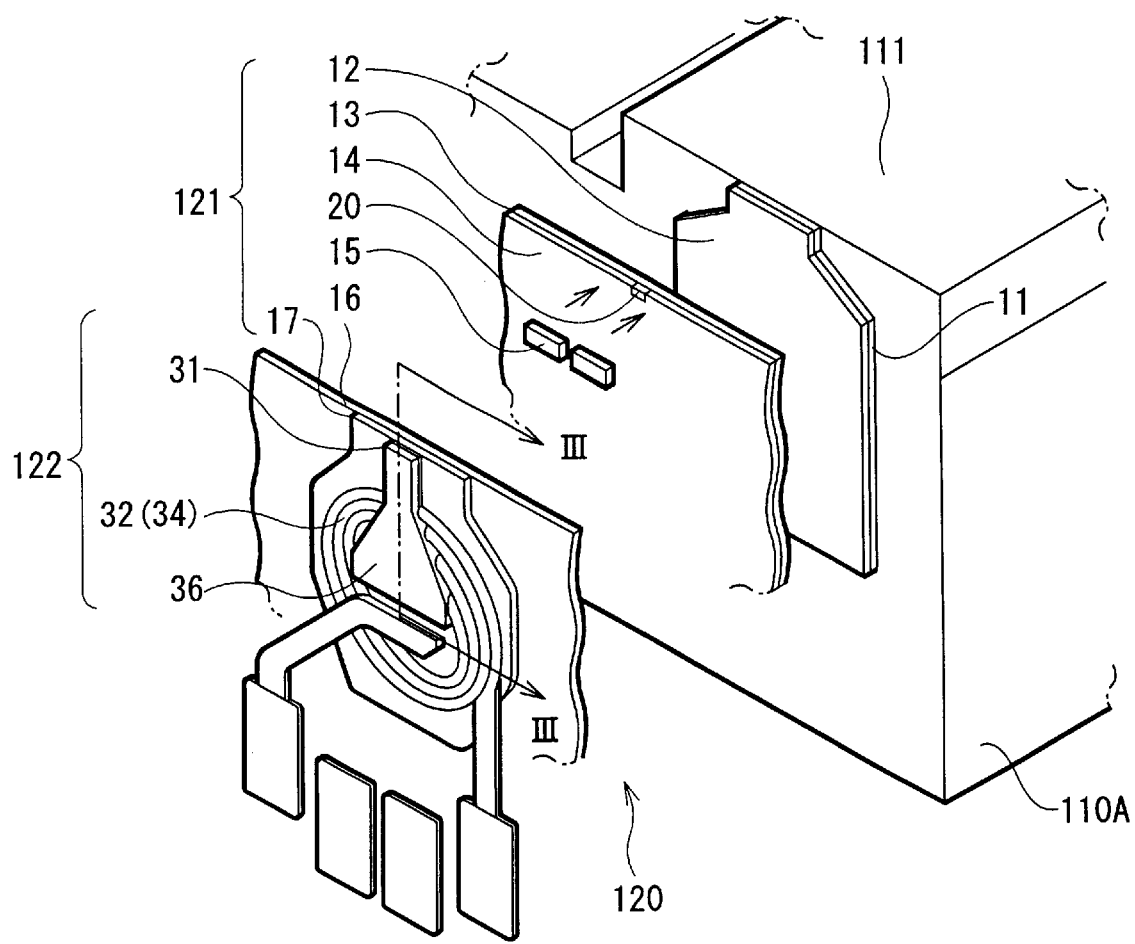
FIG. 2 is a partly exploded perspective view showing enlarged part of FIG. 1.
Figure 3:
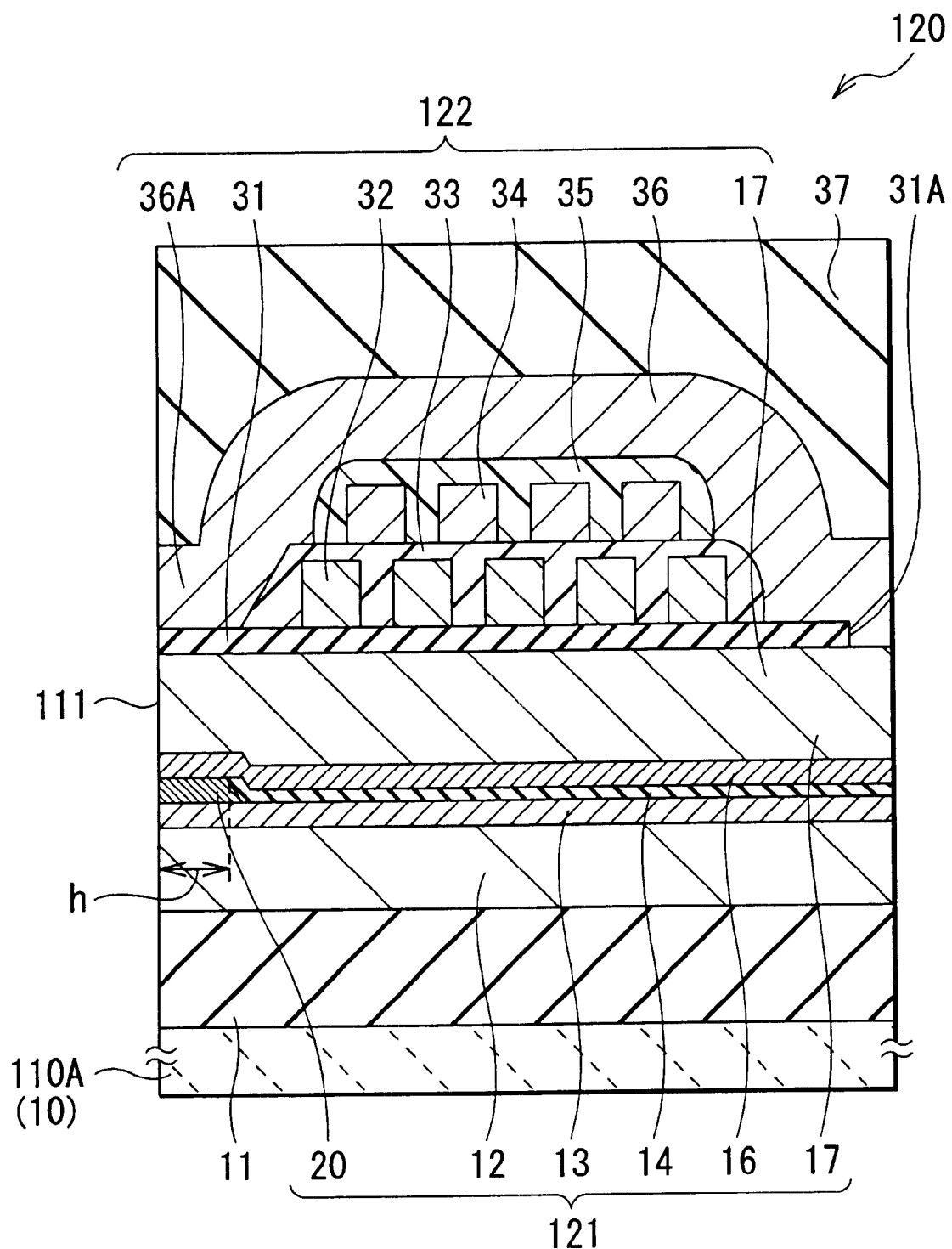
FIG. 3 is a cross sectional view for describing the structure of main components of the thin film magnetic head according to the embodiment of the invention.
Figure 4:
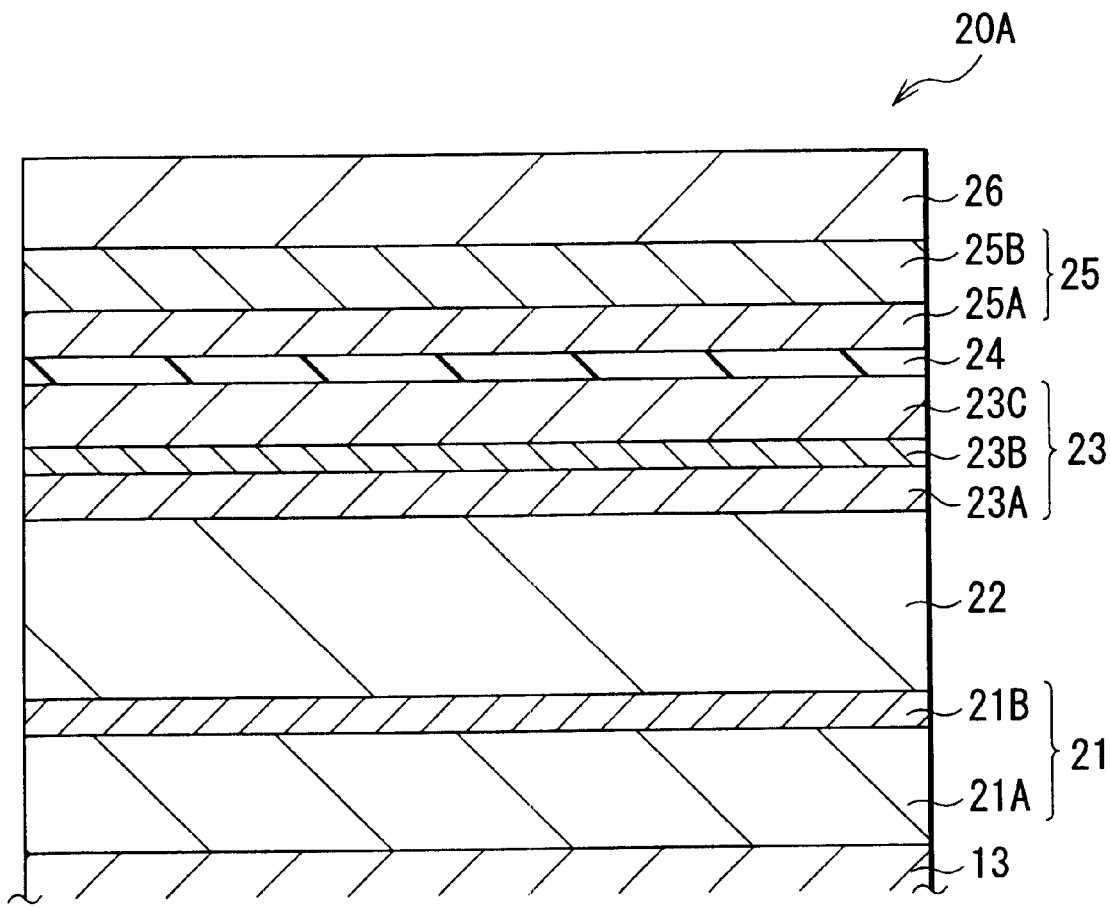
FIG. 4 is a partly enlarged view of a multilayer film shown in FIG. 3.

Next, referring to FIGS. 2 through 4, the structure of the thin film magnetic head 120 shown in FIG. 1 is described. FIG. 2 shows an exploded perspective view of the thin film magnetic head 120, and FIG. 3 is a cross sectional view of the thin film magnetic head 120 perpendicular to the air bearing surface 111, that is a cross sectional view taken along the line III—III in FIG. 2. FIG. 4 shows a partly enlarged view of FIG. 3. In addition, an overcoat layer 37 is not shown in FIG. 2.

The thin film magnetic head 120 is a composite thin film magnetic head comprising a reproducing head portion 121 for reading and a recording head portion 122 for writing laminated in order on a side surface of a base 110A with an insulating film 11, etc. disposed therebetween. First, the reproducing head portion 121 is described below.

The reproducing head portion 121 has a stack on the insulating layer 11 formed on the base and made of such as alumina ($Al_2O_3$). The stack is located near the air bearing surface 111 and includes a bottom shield layer 12, a bottom gap layer 13, a MR film pattern 20, an insulating layer 14, a top gap layer 16 and a top shield layer 17 laminated in this order.

The bottom shield layer 12 is made of a magnetic material such as a nickel-iron alloy (NiFe alloy) or the like, and has a function of preventing an unnecessary magnetic field from affecting the MR film pattern 20. The bottom gap layer 13 is made of an electrically conductive non-magnetic material such as tantalum (Ta), and interrupts magnetic coupling between the bottom shield layer 12 and the MR film pattern 20. The bottom gap layer 13 together with the bottom shield layer 12 also functions as a current path which allows a current to flow in a direction perpendicular to a film forming surface of the MR film pattern 20.

The insulating layer 14 electrically insulates the bottom gap layer 13 from the top gap layer 16, and is made of an insulating material such as alumina. The top gap layer 16 is made of an electrically conductive nonmagnetic material such as tantalum, and the top shield layer 17 is made of a magnetic material such as a NiFe alloy. The top gap layer 16 interrupts magnetic coupling between the MR film pattern 20 and the top shield layer 17, and the top gap layer 16 together with the top shield layer 17 also functions as a current path which allows a current to flow in a direction perpendicular to the film forming surface of the MR film pattern 20. Further, like the bottom shield layer 12, the top shield layer 17 prevents an unnecessary magnetic field from affecting the MR film pattern 20.

The MR film pattern 20 reads information written in a magnetic recording medium (not shown), and has a multi-layer structure as shown in, for example, FIG. 4. The MR film pattern 20 is buried in the insulating layer 14. The bottom surface of the MR film pattern 20 contacts with the bottom gap layer 13, and the top surface of the MR film pattern 20 contacts with the top gap layer 16. Further, on the insulating layer 14 disposed on the both sides of the MR film pattern 20 (in a direction orthogonal to the paper plane), a magnetic domain control layer 15 made of a hard magnetic material such as a cobalt-platinum alloy (CoPt alloy) are selectively formed. The magnetic domain control layer 15 has a function of aligning the direction of magnetization of a second ferromagnetic layer 25 to inhibit the occurrence of Barkhausen noise.

Next, the structure of the recording head portion 122 is described below. The recording head portion 122 includes a write gap layer 31, thin film coils 32 and 34, photoresist layers 33 and 35 and a top pole 36 laminated on the top shield layer 17.

The write gap layer 31 is made of an insulating material such as alumina or the like, and is formed on the top shield layer 17. The top shield layer 17 also has a function as a bottom pole of the recording head portion 122. The write gap layer 31 is partly etched to have an aperture 31A for forming a magnetic path.

The thin film coil 32 is formed in a spiral shape on the write gap layer 31 from the aperture 31A as a center. Further, the photoresist layer 33 is formed in a predetermined pattern so as to cover the thin film coil 32. On the photoresist layer 33, the thin film coil 34 is formed, and the photoresist layer 35 is further formed so as to cover the thin film coil 34. The thin film coils 32 and 34 are electrically connected with each other via a coil connection portion (not shown) so as to function as one coil.

On the write gap layer 31, the aperture 31A, the photoresist layers 33 and 35, the top pole 36 made of a magnetic material with high saturation magnetic flux density of, for example, a NiFe alloy, iron nitride (FeN) or a CoFe alloy is formed. The top pole 36 contacts with and is magnetically coupled with the top shield layer 17 via the aperture 31A of the write gap layer 31. The top pole 36 and its surroundings are covered with the overcoat layer 37 made of an insulating material such as alumina.

<Method of manufacturing magnetic head slider>

Next, a method of manufacturing the above-described magnetic head slider is described below together with a method of manufacturing a magnetoresistive device, a method of manufacturing a thin film magnetic head and a method of forming a thin film pattern according to the embodiment of the invention, which are embodied by the method of manufacturing the magnetic head slider.

Figure 5:
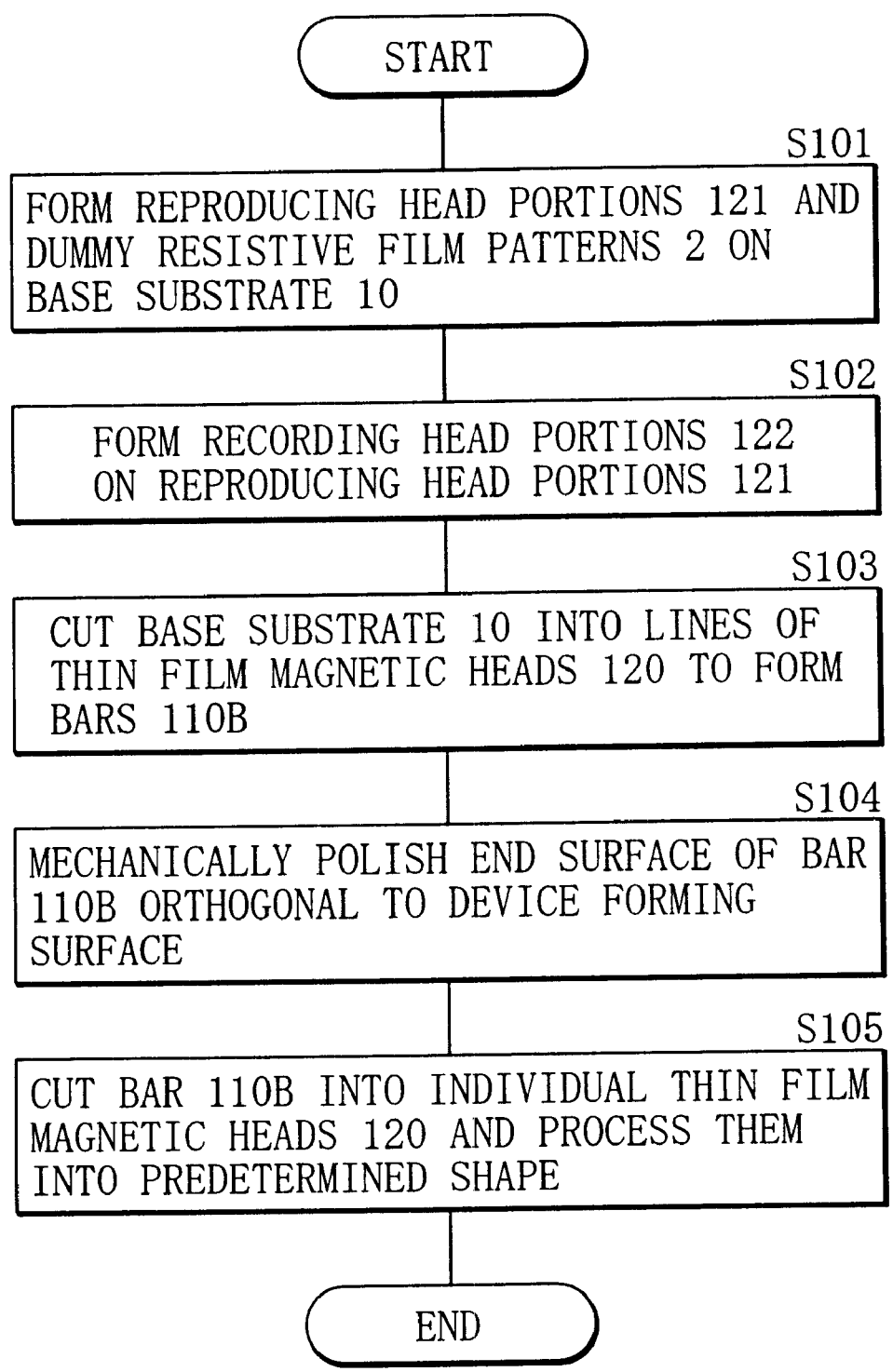
FIG. 5 is a flow chart of a method of manufacturing a thin film magnetic head slider comprising a thin film magnetic head according to the embodiment of the invention.
Figure 6A:
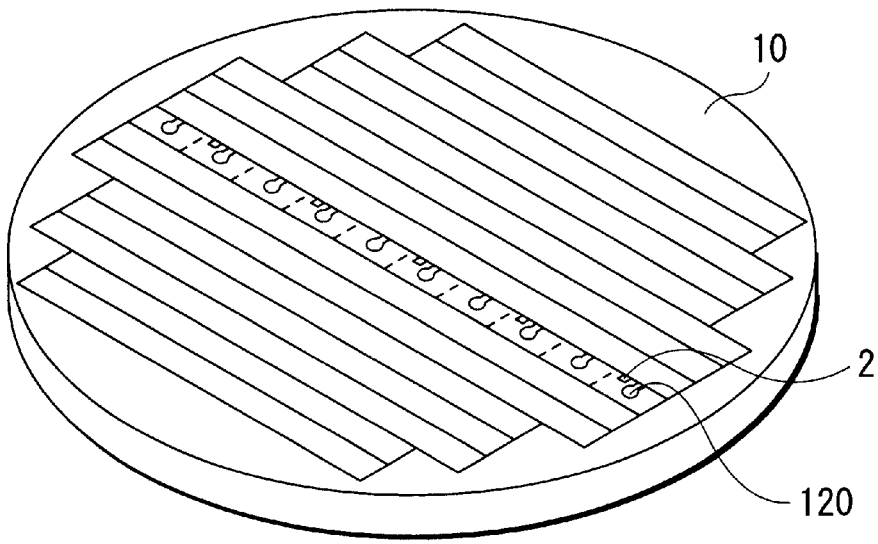
FIGS. 6A and 6B are perspective views showing one step in a method of manufacturing a magnetic head slider comprising a thin film magnetic head according to the embodiment of the invention.
Figure 6B:
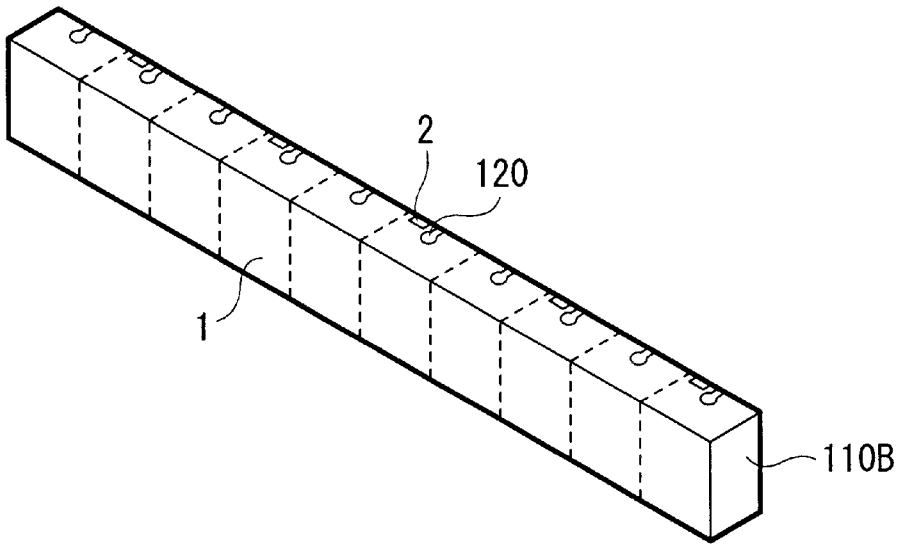

Referring to FIGS. 5, 6A and 6B, an entire method of manufacturing the magnetic head slider is described. FIG. 5 is a flow chart of the entire method of manufacturing the magnetic head slider shown in FIG. 1, and FIGS. 6A and 6B show part of the method of manufacturing the magnetic head slider.

First, as shown in FIG. 6A, a plurality of reproducing head portions 121 and a plurality of dummy resistive film patterns 2 are formed on a base substrate 10 made of, for example, AlTiC which is a composite material including alumina and titanium carbonate (TiC) with an insulating film disposed therebetween (step S101 in FIG. 5). At this time, the reproducing head portions 121 are arranged so as to make a line at regular intervals, and further so as to make a plurality of such lines at regular intervals. Moreover, a certain amount of the dummy resistive film patterns 2 are included in each of the lines of the reproducing head portions 121. In addition, the total amount of the dummy resistive film patterns 2 may be generally less than the amount of the reproducing head portions 121 in each line. A step of forming this pattern is described later.

Next, the recording head portions 122 are formed on the reproducing head portions 121 (step S102), and a protective film is formed so as to cover the whole. Thereby, the formation of the thin film magnetic head 120 which is a laminate of the reproducing head portion 121 and the recording head portion 122 is tentatively completed. A step of forming the thin film magnetic head 120 is described later.

Then, the base substrate 10 is cut into the lines of the thin film magnetic heads 120, and as shown in FIG. 6B, a plurality of stick-shaped bars 110B including the plurality of reproducing head portions 121 and the plurality of dummy resistive film patterns are formed (step S103). Then, a surface adjacent to an area where the thin film magnetic head 120 is formed among cut surfaces of the bar 110B (an end surface orthogonal to a device forming surface) is mechanically polished (step S104) so as to form the air bearing surface 111. After that, a protective film made of DLC (Diamond-Like Carbon) or the like is formed on the air bearing surface 111. A step of forming (polishing) the air bearing surface 111 is described later.

Next, the bar 110B is cut by use of a dicing saw or the like to form a plurality of blocks each including one thin film magnetic head 120. Then, rail processing or the like is carried out on each block. Thereby, a substantially rectangular-shaped magnetic head slider (refer to FIG. 1) made of the composite type thin film magnetic head 120 including the reproducing head portion 121 and the recording head portion 122 disposed on the base 110A is completely formed (step S105).

Next, referring to FIGS. 2 and 3, a method of manufacturing the thin film magnetic head 120 is described below in more detail.

First, on the base 110A (practically the base substrate 10), the insulating layer 11 made of alumina or the like is formed through sputtering or the like, then the bottom shield layer 12 made of an electrically conductive magnetic material such as an NiFe alloy is selectively formed on the insulating layer 11 through sputtering or the like. Next, on the bottom shield layer 12, the bottom gap layer 13 made of an electrically conductive non-magnetic material such as tantalum is formed.

Next, on the bottom gap layer 13, the MR film pattern 20 having a tunnel junction structure is formed, and on the bottom gap layer 13, the insulating layer 14 for filling the surroundings of the MR film pattern 20 is formed. Then, the magnetic domain control layer 15 (refer to FIG. 2) is selectively formed on the insulating layer 14 disposed on the both side (in the direction orthogonal to the paper plane of FIG. 3) of the MR film pattern 20. Further, the dummy resistive film pattern 2 (not shown in FIGS. 2 and 3, refer to FIG. 19) to be described later is formed on the insulating layer 14 disposed at a predetermined distance from the position where the thin film magnetic head 120 is formed. The dummy resistive film pattern 2 is used to monitor the amount of polishing in a step of forming (polishing) the air bearing surface 111.

A multilayer film 20A with the structure shown in FIG. 4 is formed, and then the multilayer film 20A is patterned through selectively etching by use of EB lithography and photolithography to form the MR film pattern 20. On the other hand, a resistive film is formed, and then the resistive film is patterned through selectively etching by use of photolithography to form the dummy resistive film pattern 2. A step of forming the MR film pattern 20 and the dummy resistive film pattern 2 is described later.

Next, the top gap layer 16 made of an electrically conductive non-magnetic material such as tantalum is formed through sputtering or the like so as to cover the bottom gap layer 13, the MR film pattern 20 and the magnetic domain control layer 15 (refer to FIG. 2). Further, the top shield layer 17 made of an electrically conductive magnetic material such as a NiFe alloy is selectively formed on the top gap layer 16 through, for example, plating.

As described above, the formation of the reproducing head portion 121 including the tunneling MR film pattern 20, the magnetic domain control layer 15 and a path (the top shield layer 17, the top gap layer 16, the bottom gap layer 13 and the bottom shield layer 12) which allows a current to flow in a direction perpendicular to the film forming surface of the MR film pattern 20 is tentatively completed.

Next, the recording head portion 122 is formed on the reproducing head portion 121. More specifically, the write gap layer 31 is selectively formed on the top shield layer 17 through sputtering or the like, then the write gap layer 31 is partly etched to form the aperture 31A for forming a magnetic path.

Then, after the thin film coil 32 of a spiral shape from the aperture 31A as the center is formed on the write gap layer 31, the photoresist layer 33 which determines a throat height is formed in a predetermined pattern so as to cover the thin film coil 32. In addition, the throat height is a distance from the front end of the photoresist layer 33, in which the thin film coil 32 is buried, to the air bearing surface 111. After that, the thin film coils 34 and the photoresist layers 35 are formed on the photoresist layer 33. In addition, in the embodiment, the thin film coil has a two layer structure, although the thin film coil may have a single layer structure or three or more layer structure.

After forming the photoresist layer 35, the top pole 36 is selectively formed on the write gap layer 31, the aperture 31A and the photoresist layers 33 and 35. Next, the write gap layer 31 is selectively etched by use of the top pole 36 as a mask through ion milling or the like. Then, a resist layer (not shown) is formed, and the top shield layer 17 is selectively etched to a predetermined depth by use of the resist layer as a mask in an area in the vicinity of an area where the air bearing surface 111 is formed. Thereby, the recording head portion 122 is formed.

Finally, the overcoat layer 37 made of an insulating material such as alumina is formed so as to cover all components including the top pole 36. Thus, the formation of the magnetic head 120 comprising the reproducing head portion 121 and the recording head portion 122 is completed.

Next, referring to FIGS. 7A through 18B, a method of forming the MR film pattern and the dummy resistive film pattern which is a major feature of the embodiment is described below. FIGS. 7A, 8A, 9A, 10A, 11A, 12A, 13A, 14A, 15A, 16A, 17A and 18A show partly enlarged plan views of the base substrate 10 (refer to FIGS. 6A and 6B), and FIGS. 7B, 8B, 9B, 10B, 11B, 12B, 13B, 14B, 15B, 16B, 17B and 18B show partly enlarged cross sectional views taken along the line x—x in FIGS. 7A, 8A, 9A, 10A, 11A, 12A, 13A, 14A, 15A, 16A, 17A and 18A, respectively. In these drawings, the base 110 indicates a laminate of the insulating layer 11, the bottom shield layer 12 and the bottom gap layer 13 formed on the base substrate 10 (the base 110A).

Figure 7A:
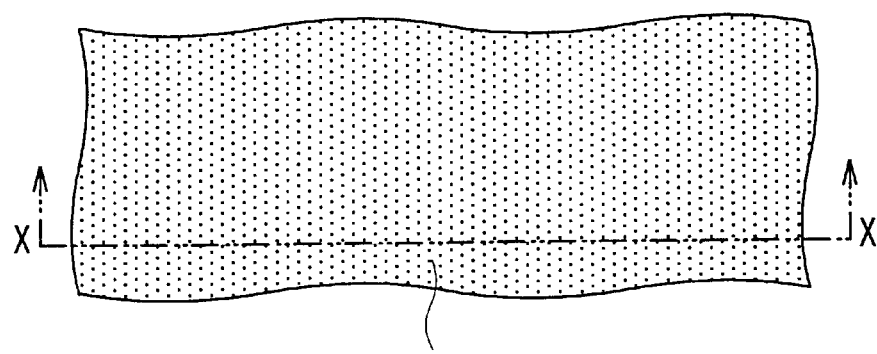
FIGS. 7A and 7B are a plan view and a cross sectional view for describing a step of a method of manufacturing a thin film magnetic head according to a first embodiment of the invention.
Figure 7B:
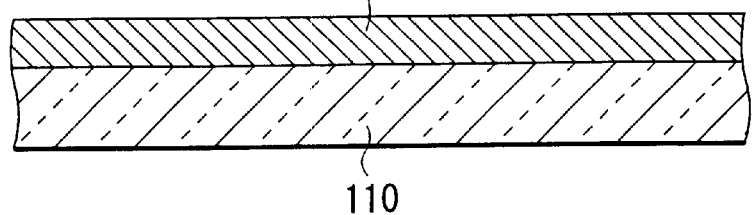

First of all, as shown in FIGS. 7A and 7B, the multilayer film 20A which will become the MR film pattern 20A through patterning to be described later is formed all over the base 110. The multilayer film 20A corresponds to a specific example of "a magnetoresistive film" in the invention. The multilayer film 20A is formed through the following steps, for example.

As shown in FIG. 4, a tantalum (Ta) layer 21A and a NiFe alloy layer 21B are laminated in this order on the bottom gap layer 13 which is the uppermost layer of the base 110 to form a base layer 21 including these two layers. Next, an antiferromagnetic layer 22 made of, for example, a platinum-manganese (PtMn) alloy is formed on the base layer 21 through sputtering or the like. Then, on the antiferromagnetic layer 22, a magnetic layer 23A made of, for example, a CoFe alloy, a non-magnetic layer 23B made of ruthenium (Ru) or the like and a magnetic layer 23C made of a CoFe alloy or the like are laminated in this order to form a first ferromagnetic layer 23.

After forming the first ferromagnetic layer 23, a tunnel barrier layer 24 made of an insulating material is formed on the first ferromagnetic layer 23. The tunnel barrier layer 24 is a metal oxide such as alumina, which can be obtained through the following steps. A metal film made of aluminum or the like is formed through, for example, sputtering, then the metal film is oxidized through heating, thereby the metal oxide such as alumina can be obtained.

Next, a ferromagnetic layer 25A made of a CoFe alloy or the like and a ferromagnetic layer 25B made of a NiFe alloy or the like are laminated in this order on the tunnel barrier layer 24 through sputtering or the like to form a second ferromagnetic layer 25. Further, a cap layer 26 as a protective layer made of, for example, tantalum (Ta) or the like is formed on the second ferromagnetic layer 25 through sputtering or the like. Thus, the formation of the multilayer film 20A is completed.

Figure 8A:
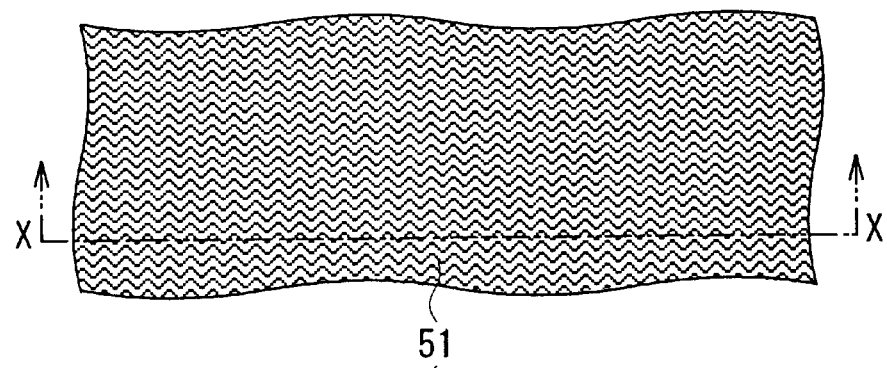
FIGS. 8A and 8B a plan view and a cross sectional view for describing a step following the step of FIGS. 7A and 7B.
Figure 8B:
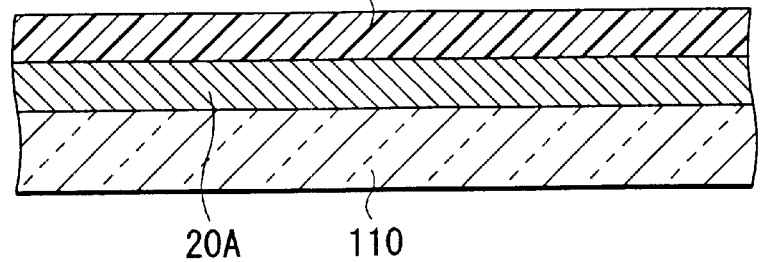

After forming the multilayer film 20A, as shown in FIGS. 8A and 8B, an EB (electron beam) resist film 51 is formed all over the multilayer film 20A. It is preferable that the EB resist film 51 is made of a material whose structure changes by applying an electron beam such as NEB-22A2 (a product name manufactured by Sumitomo Chemical, Co., Ltd.), and the film thickness of the EB resist film 51 is within a range from 200 nm to 500 nm.

Figure 9A:
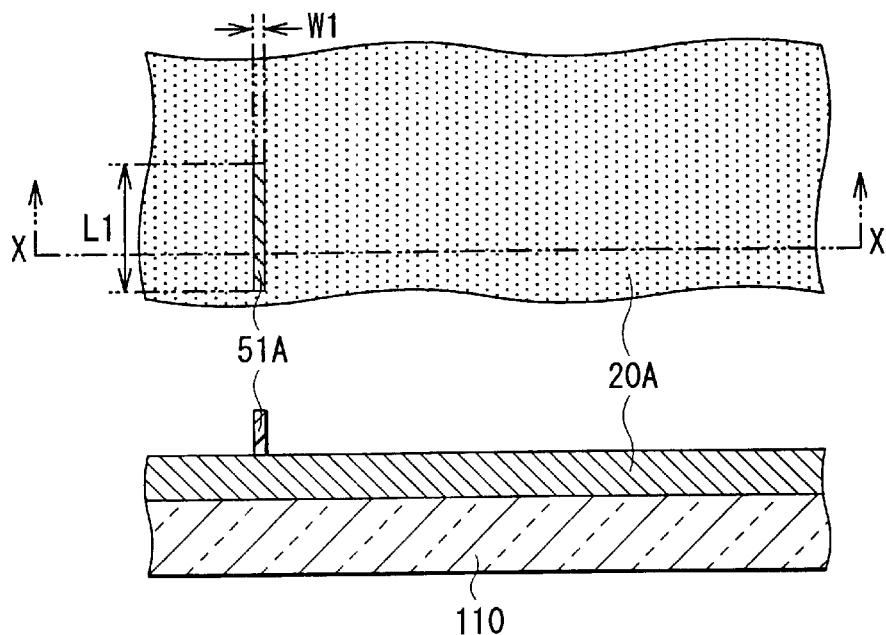
FIGS. 9A and 9B are a plan view and a cross sectional view for describing a step following the step of FIGS. 8A and 8B.
Figure 9B:
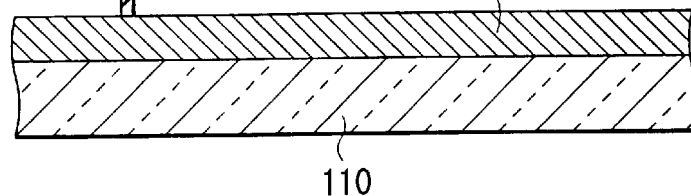

Next, as shown in FIGS. 9A and 9B, a EB resist pattern 51A of a strip shape is formed through EB lithography on a portion of the multilayer film 20A where the MR film pattern 20 should be formed. More specifically, after selectively performing exposures (lithography) on the EB resist film 51 by the irradiation with an electron beam, an unnecessary portion (unexposed portion) is removed through development processing by use of a predetermined developer to form the EB resist pattern 51A. Further, as the requirements for exposures by use of the electron beam, it is preferable that the accelerating voltage of electron beam is within a range from 20 kV to 100 kV, and the electrical charge is within a range from 10 $\mu C/cm^2$ to 100 $\mu C/cm^2$. However, these requirements are not limited to the above.

A dimension W1 of the EB resist pattern 51A in the width direction (direction along the line x—x) determines the dimension of the MR film pattern 20 in the width direction, and the dimension W1 is set at an extremely small value ranging from approximately 10 nm to 200 nm, for example. In the embodiment, by use of EB lithography, more accurate patterning can be carried out compared to the use of photolighography, so the extremely small dimension W1 in the width direction can be secured. On the other hand, a dimension L1 of the EB resist pattern 51A in the height direction (direction orthogonal to the line x—x) is set at a relatively large value ranging from approximately 500 nm to 3 $\mu m$, for example. In addition, the accuracy of the dimension L1 in the height direction and a forming position of the EB resist pattern 51A in the height direction may be relatively rough. As described later, the EB resist pattern 51A in the height direction is patterned again in a post-process.

Figure 10A:
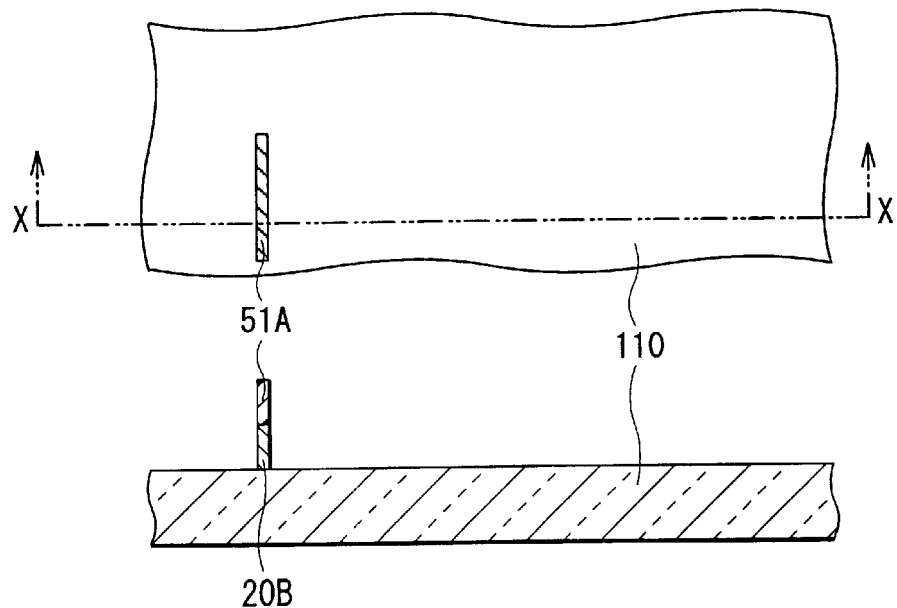
FIGS. 10A and 10B are a plan view and a cross sectional view for describing a step following the step of FIGS. 9A and 9B.
Figure 10B:
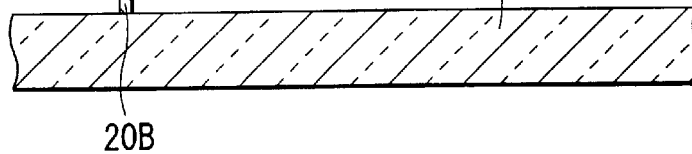

Then, as shown in FIGS. 10A and 10B, the multilayer film 20A is selectively etched by use of the EB resist pattern 51A as a mask through, for example, ion milling or the like. Thereby, as shown in FIG. 10B, a MR film pattern 20B of a thin strip shape is formed.

Next, as shown in FIGS. 11A and 11B, an insulating layer 62 is formed so as to cover the whole surface, then as shown in FIGS. 12A and 12B, the EB resist pattern 51A on the MR film pattern 20B and the insulating layer 62 thereon are removed through lift off processing to expose the MR film pattern 20B. In this stage, the surroundings of the MR film pattern 20B is filled with the insulating layer 62, so the whole surface is substantially flat.

As shown in FIG. 12A, the MR film pattern 20B has a dimension in the width direction equal to the dimension W1 of the EB resist pattern 51A in the width direction, which is the final dimension of the MR film pattern 20 in the width direction (refer to FIGS. 2 and 3). Further, the dimension of the MR film pattern 20 in the height direction is equal to the dimension L1 of the EB resist pattern 51A in the height direction.

Next, as shown in FIGS. 13A and 13B, a photoresist film 53 of a substantially rectangular shape is selectively formed so as to cover only the whole MR film pattern 20B and its surroundings, then as shown in FIGS. 14A and 14B, the dummy resistive film 2A is formed so as to cover the photoresist film 53 and the insulating layer 62. The dummy resistive film 2A will become the dummy resistive film pattern 2 through patterning to be described later. The dummy resistive film pattern 2A is made of a metal film of, for example, a NiFe alloy or the like having a sheet resistance ranging from 10 Ω/□ to 50 Ω/□, for example.

Then, as shown in FIGS. 15A and 15B, the photoresist film 53 and the dummy resistive film 2A thereon are removed through lift off processing to form an aperture 2AK in the dummy resistive film 2A, thereby the MR film pattern 20B and an area of the insulating layer 62 in the vicinity of the MR film pattern 20B is exposed again.

Next, as shown in FIGS. 16A and 16B, through photolithography, that is, a series of steps of forming a photoresist film all over the surface, then selectively exposing the photoresist film by use of light such as ultraviolet light and carrying out development processing, photoresist patterns 54A and 54B are selectively formed at the same time. At this time, the photoresist pattern 54A is formed so as to cross the exposed MR film pattern 20B in the width direction (direction along the line x—x) and partly cover the MR film pattern 20B. On the other hand, the photoresist pattern 54B is formed in an area at a predetermined distance from the MR film pattern 20B (that is, an area where the dummy resistive film pattern 2 will be formed).

As shown in FIG. 16A, the photoresist pattern 54A has, for example, a substantially rectangular shape. A dimension W2 of the photoresist pattern 54A in the width direction (direction parallel to the line x—x) is sufficiently larger than the dimension W1 (refer to FIG. 12A) of the MR film pattern 20B in the width direction, and a dimension L2 of the photoresist pattern 54A in the height direction (direction orthogonal to the line x—x) is smaller than the dimension L1 (refer to FIG. 12A) of the MR film pattern 20B in the height direction.

On the other hand, the photoresist pattern 54B is formed in a shape similar to the letter U, and has a portion 54BK extending in the lateral direction (direction parallel to the line x—x) in the shape of the letter U. The photoresist pattern 54B is formed so as to have a predetermined relative positional relationship between the photoresist patterns 54A and 54B in the height direction (direction orthogonal to the line x—x). More specifically, the photoresist patterns 54A and 54B are formed so that a distance between a position P1 of a back edge 54AS of the photoresist pattern 54A and a position P2 of a back edge 54BS of the portion 54BK in the photoresist pattern 54B is of a predetermined value 1. The back edge means one side edge of each portion, the edge being opposite to another side edge where the air bearing surface 111 is formed. Further, the photoresist pattern 54B has a dimension of approximately from 20 μm to 50 μm in the width direction and a dimension of approximately from 20 μm to 50 μm in the height direction, so the photoresist pattern 54B is sufficiently larger than the photoresist pattern 54A.

As described later, the photoresist pattern 54B is provided to form the dummy resistive film pattern 2 which is a reference to the control of polishing amount (the control of the MR height) in the polishing step S104 (refer to FIG. 5), so it is extremely important to keep the above predetermined value d1 constant with high accuracy. In this respect, in the embodiment, the photoresist patterns 54A and 54B are concurrently formed through one photolithography process, so it is easier to keep the value d1 constant with high accuracy.

Figure 17A:
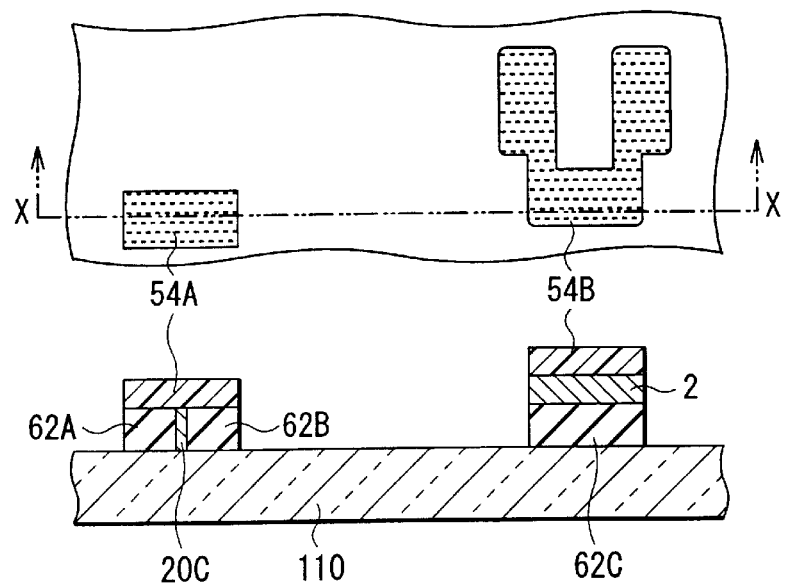
FIGS. 17A and 17B are a plan view and a cross sectional view for describing a step following the step of FIGS. 16A and 16B.
Figure 17B:
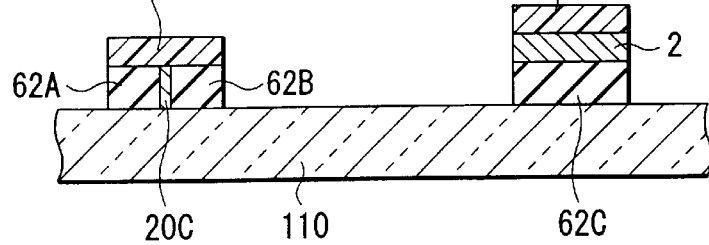

Next, as shown in FIGS. 17A and 17B, the insulating layer 62, the MR film pattern 20B and the dummy resistive film 2A are etched and patterned by use of the photoresist patterns 54A and 54B as masks through, for example, ion milling. Thereby, a MR film pattern 20C and insulating layer patterns 62A and 62B are formed under the photoresist pattern 54A. On the other hand, the dummy resistive film pattern 2 is formed under the photoresist pattern 54B, and an insulating layer pattern 62C is formed under the dummy resistive film pattern 2. At this time, the positional relationship between the MR film pattern 20C and the dummy resistive film pattern 2 is equivalent to the positional relationship (refer to FIG. 16A) between the photolithography pattern 54A and the photolithography pattern 54B. In other words, a distance in the height direction (direction orthogonal to the polishing surface) between the position P1 of the back edge of the MR film pattern 20C and the position P2 of the back edge of the portion 2K extending in the width direction in the dummy resistive film pattern 2 is held at the constant value d1 with high accuracy. The MR film pattern 20C corresponds to a specific example of "a first thin film pattern" in the invention, and the dummy resistive film pattern 2 corresponds to a specific example of "a second thin film pattern" in the invention.

Figure 18A:
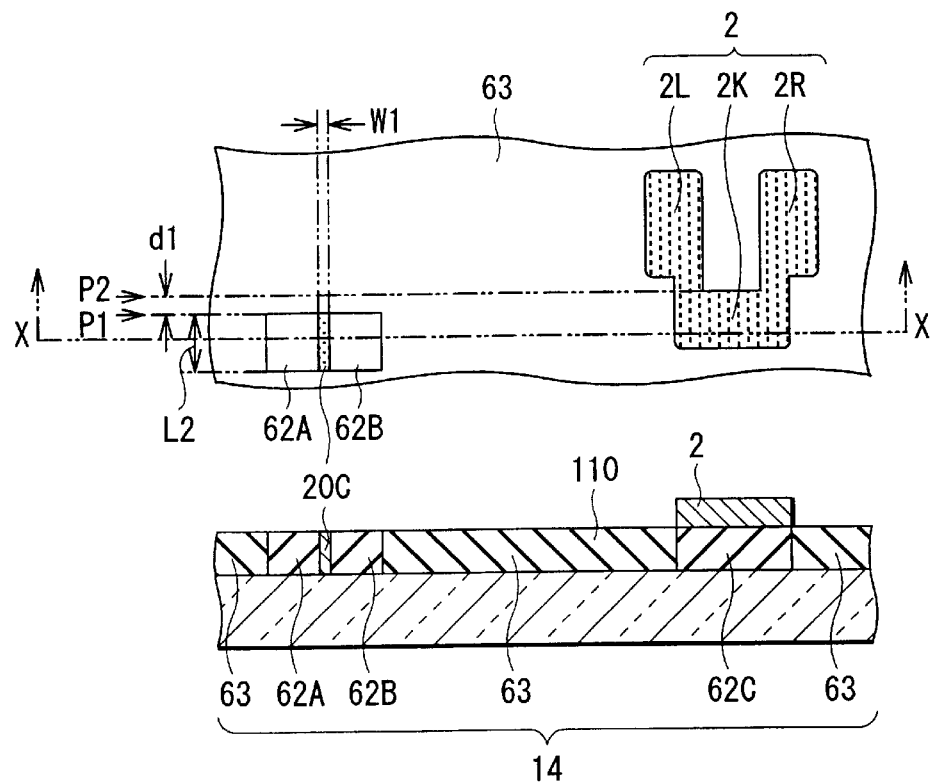
FIGS. 18A and 18B are a plan view and a cross sectional view for describing a step following the step of FIGS. 17A and 17B.
Figure 18B:
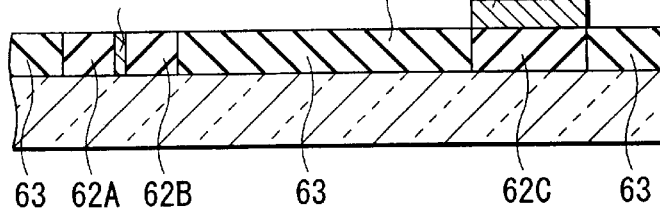

Then, after forming an insulating layer (not shown) on the whole surface area, the photoresist films 54A and 54B and the insulating layer thereon are removed through lift off processing to expose the MR film pattern 20C, the insulating layer patterns 62A and 62B and the dummy resistive film pattern 2 as shown in FIGS. 18A and 18B. Thus, the MR film pattern 20C, of which the surroundings are filled with the insulating layers 62A, 62B, 62C and 63, and which has the dimension W1 in the width direction (direction parallel to the line x—x) and the dimension L2 in the height direction (direction orthogonal to the line x—x), is formed. At the same time, the dummy resistive film pattern 2 is formed on the insulating layer 62C. In addition, the insulating layer including the insulating layers 62A, 62B, 62C and 63 corresponds to the insulating layer 14 in FIGS. 2 and 3. An outline of the dimension L2 in the MR film pattern 20C corresponds to a specific example of "a first outline" in the invention, and an outline of the dimension W1 in the MR film pattern 20C corresponds to a specific example of "a second outline" in the invention. Further, the dimension L2 corresponds to a specific example of "a dimension in the height direction" in the invention.

Figure 19:
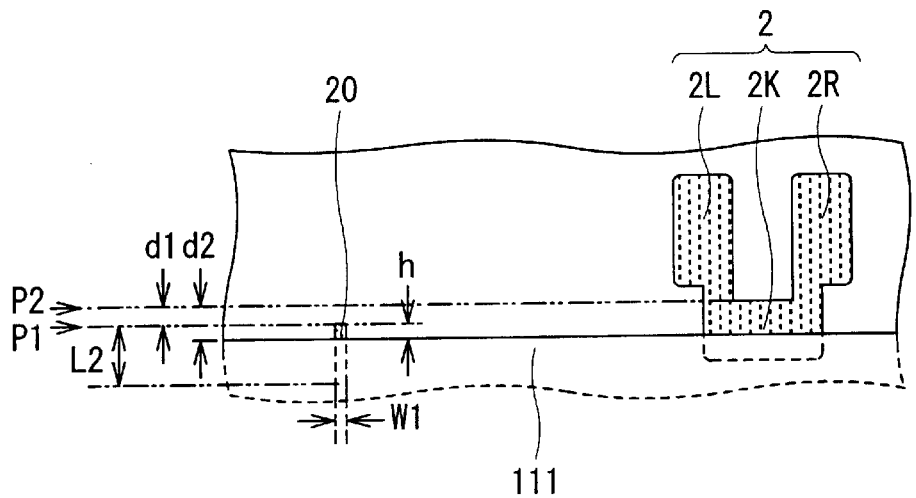
FIG. 19 is a plan view showing one step in a method of manufacturing a thin film magnetic head according to the embodiment of the invention.

Next, a step of polishing the cut surface of the bar 110B (forming the air bearing surface 111) shown in step S104 of FIG. 5 is described below referring to FIGS. 18A and 19. FIG. 19 shows a plan view of main components of the device forming surface of the bar 110B after the step of polishing is completed. In addition, the drawing shows a portion corresponding to FIG. 18A. A portion indicated by a broken line indicates a portion removed through polishing.

The polishing amount in the polishing step determines the final MR height, so it is necessary to control the polishing amount with high accuracy. The MR height here indicates a length h from the air bearing surface 111 (refer to FIG. 3) to an end portion of the MR film pattern 20 on the side opposed to the air bearing surface 111.

The MR height h is a factor which determines the reproduction output of the reproducing head portion 121, and the shorter the MR height h is, the higher reproduction output can be obtained. However, if the MR height h is too short, the electrical resistance of the MR film pattern 20 increases, thereby resulting in a declined reproduction output due to a rise in temperature, and a shorter life of the MR film pattern 20. Therefore, it is preferable that the MR height h is as short as possible within a range which does not cause an excessive rise in temperature.

As shown in FIG. 18A, a distance in the height direction (direction orthogonal to the polishing surface) between the position P1 of the back edge of the MR film pattern 20C and the position P2 of the back edge of the portion 2K extending in the width direction in the dummy resistive film pattern 2 is held at the constant value d1 with high accuracy.

When the step of polishing the cut surface of the bar starts in this state, the height dimension of the MR film pattern 20C and the height dimension of the portion 2K in the dummy resistive film pattern 2 are gradually shortened at the same time. The dummy resistive film pattern 2 has two pad portions 2L and 2R, and a wire (not shown) is connected with each of them through bonding. A measured current is applied to the dummy resistive film pattern 2 from a resistance measuring instrument (not shown) through the wires. When the portion 2K of the dummy resistive film pattern 2 becomes thinner in accordance with the progress of polishing, the measured resistance increases. Then, when the resistance reaches a predetermined value, the polishing step is stopped. The height dimension of the MR film pattern 20 at this time is the MR height h.

As shown in FIG. 19, the height dimension of the portion 2K of the dummy resistive film pattern 2 after polishing is assumed as d2, the MR height h is expressed by the following formula (1).

$$h = d2 - d1 \qquad (1)$$

The value d2 can be made constant with high accuracy through monitoring the above resistance, and the value d1 can be made constant with high accuracy through photolithography described in FIGS. 16A and 16B. Therefore, the MR height h can be made constant with high accuracy by the formula (1). For example, when the width dimension W1 is approximately 150 nm, it is preferable that the MR height h is set at approximately 100 nm.

As described above, according to the embodiment, the patterning step which determines the extremely small dimension W1 of the MR film pattern 20 (20C) in the width direction is carried out through EB lithography, so compared with photolithography, patterning with higher accuracy can be carried out. Therefore, the thin strip shaped MR film pattern 20 having an extremely small width can be formed with higher accuracy, thereby data can be read from a recording medium in which the date is written at very high density.

On the other hand, the dummy resistive film pattern 2 or a portion of the dimension L2 of the MR film pattern 20C in the height direction is much larger in size than the dimension W1 of the MR film pattern 20C in the width direction, so it is easier to secure patterning accuracy. Therefore, the dummy resistive film pattern 2 and the portion are patterned through photolithography. Compared with EB lithography, time required for the patterning can be reduced.

In other words, according to the embodiment, without an excessive reduction in throughput, patterning with accuracy according to the size of a portion to be patterned, that is, most suitable patterning for the portion to be patterned can be carried out, so efficient patterning in terms of time and accuracy can be carried out.

Moreover, according to the embodiment, the step of patterning which determines the dimension L2 of the MR film pattern 20C in the height direction before polishing and the step of patterning the dummy resistive film pattern 2 are concurrently carried out through photolithography, so compared with the case that the dimension L2 of MR film pattern 20C in the height direction and the dummy resistive film pattern 2 are patterned only through EB lithography, the positional relationship between the MR film pattern 20C and the dummy resistive film pattern 2 can be held constant with higher accuracy. In the case where EB lithography is used, due to charge-up of the base 110, etc., relative displacement between the MR film pattern 20C and the dummy resistive film pattern 2 is more likely to occur.

In other words, according to the embodiment, in spite of using EB lithography in part of the lithography step, variations in the distance in the height direction between the MR film pattern 20C and the dummy resistive film pattern 2 are reduced. Therefore, in the step of polishing the cut surface of the bar 110B to form the air bearing surface, even if the polishing amount is controlled by use of the resistance of the dummy resistive film pattern 2 as a measure, the MR height h which is the dimension of the MR film pattern 20C in the height direction at the time when polishing is completed can be held constant with higher accuracy.

[Second Embodiment]

Now, a second embodiment of the invention is described below.

As described above, in the first embodiment, after the patterning step which determines the width dimension W1 of the MR film pattern 20C specifying the track width of the recording medium is carried out, a step of patterning a portion of the height dimension L2 of the MR film pattern 20C and the dummy resistive film pattern 2 is carried out. On the other hand, in the second embodiment, before the patterning step which determines the width dimension W1 of the MR film pattern 20C is carried out, the step of patterning the portion of the height dimension L2 of the MR film pattern 20C and the dummy resistive film pattern 2 is carried out.

Referring to FIGS. 20A through 36B, a method of manufacturing a magnetoresistive device, a method of manufacturing a thin film magnetic head and a method of forming a thin film pattern according to the embodiment is described below. Only a feature different from the first embodiment, that is, the step of patterning the MR film pattern 20 and the dummy resistive film pattern 2 is explained below, and other steps will not be further explained. Further, in FIGS. 20A through 36B, like components are denoted by like numerals as of the first embodiment (refer to FIGS. 7A through 18B), and will not be further explained.

Figure 20A:
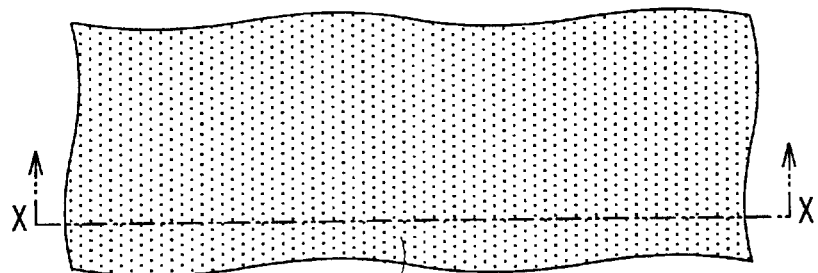
FIGS. 20A and 20B are a plan view and a cross sectional view for describing a step of a method of manufacturing a thin film magnetic head according to a second embodiment of the invention.
Figure 20B:
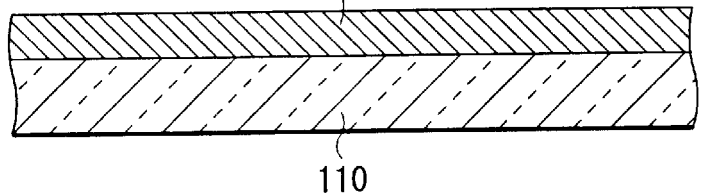
Figure 21A:
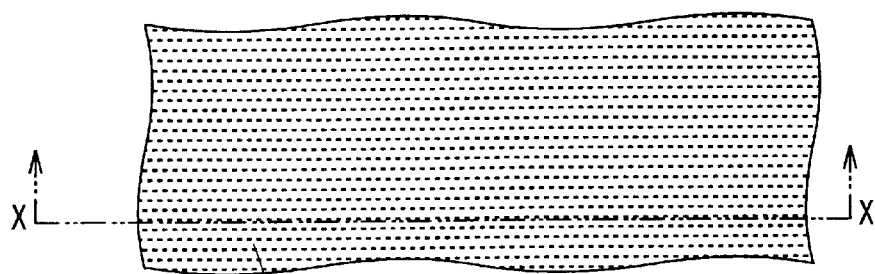
FIGS. 21A and 21B are a plan view and a cross sectional view for describing a step following the step of FIGS. 20A and 20B.
Figure 21B:
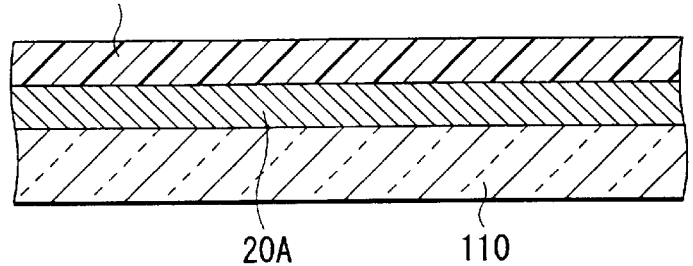
Figure 22A:
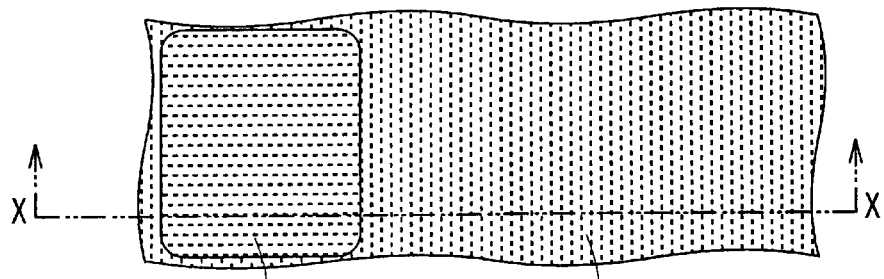
FIGS. 22A and 22B are a plan view and a cross sectional view for describing a step following the step of FIGS. 21A and 21B.
Figure 22B:
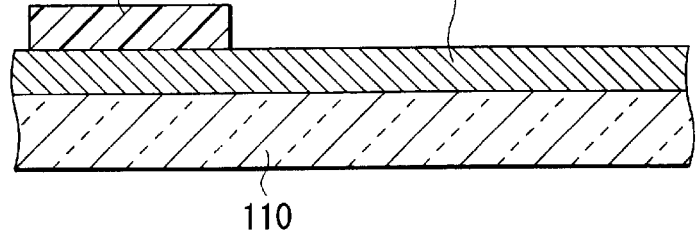

In the embodiment, after forming the multilayer film 20A on the base 110 as shown in FIGS. 20A and 20B, a photoresist film 55 is formed on the multilayer film 20A as shown in FIGS. 21A and 21B. Then, as shown in FIGS. 22A and 22B, the photoresist film 55 is patterned through photolithography to form a photoresist pattern 55A so as to cover the whole area where a MR film pattern 20E (refer to FIG. 30B) to be described later will be formed.

Figure 23A:
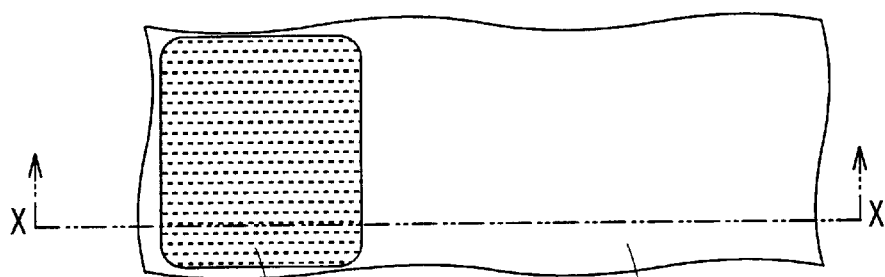
FIGS. 23A and 23B are a plan view and a cross sectional view for describing a step following the step of FIGS. 22A and 22B.
Figure 23B:
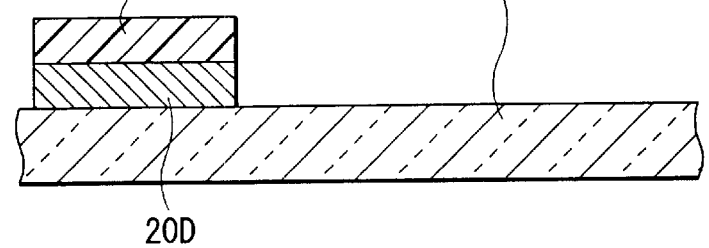

Next, as shown in FIGS. 23A and 23B, the multilayer film 20A is selectively etched by use of the photoresist pattern 55A as a mask through, for example, ion milling or the like. Thereby, as shown in FIG. 23B, a MR film pattern 20D having the same shape as the photoresist pattern 55A is formed under the photoresist pattern 55A.

Figure 24A:
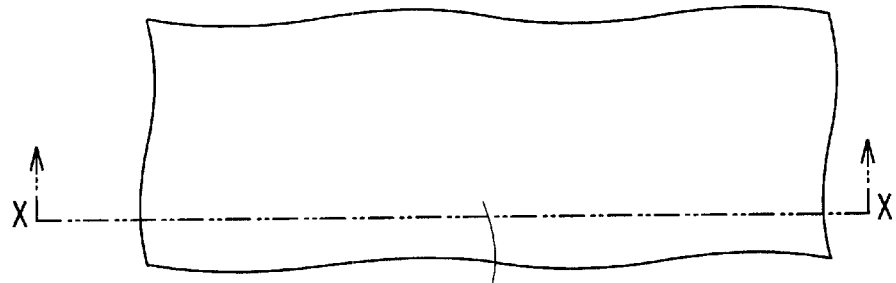
FIGS. 24A and 24B are a plan view and a cross sectional view for describing a step following the step of FIGS. 23A and 23B.
Figure 24B:
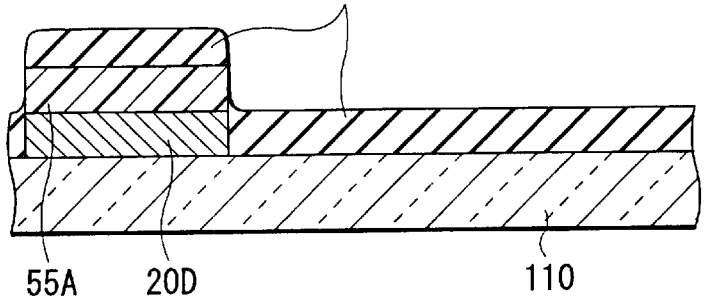
Figure 25A:
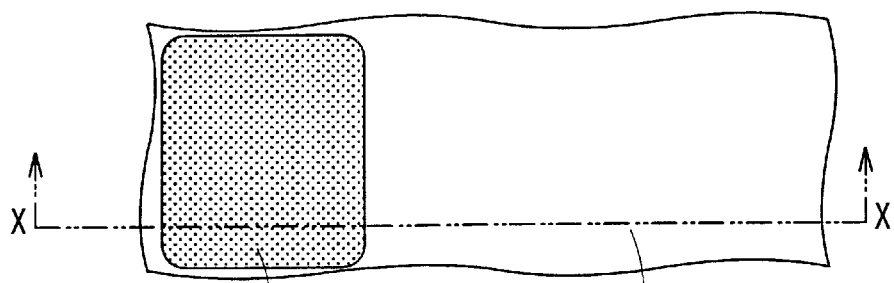
FIGS. 25A and 25B are a plan view and a cross sectional view for describing a step following the step of FIGS. 24A and 24B.
Figure 25B:
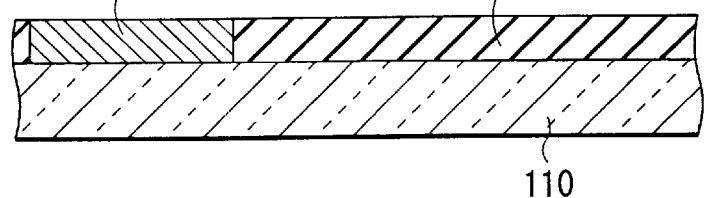

Next, after forming the insulating layer 62 so as to cover the whole area as shown in FIGS. 24A and 24B, the photoresist pattern 55A on the MR film pattern 20D and the insulating layer 62 on the photoresist pattern 55A are removed through lift off processing as shown in FIGS. 25A and 25B. Thus, the upper surface of the MR film pattern 20D is exposed. In this stage, all of the surroundings of the MR film pattern 20D are filled with the insulating layer 62, so the whole surface is substantially flat.

Figure 26A:
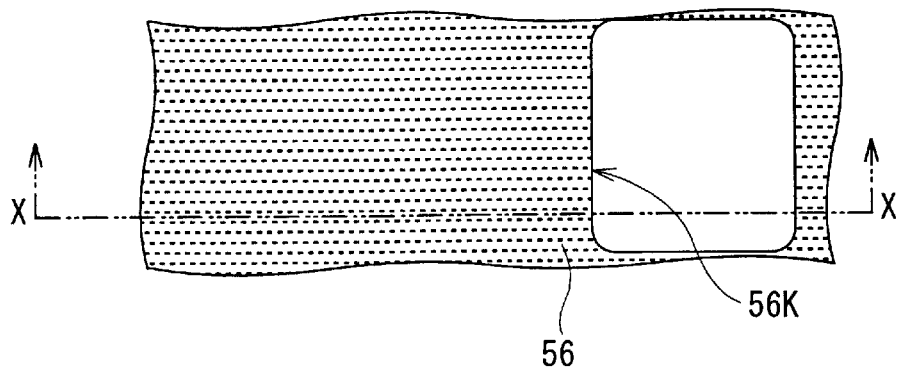
FIGS. 26A and 26B are a plan view and a cross sectional view for describing a step following the step of FIGS. 25A and 25B.
Figure 26B:
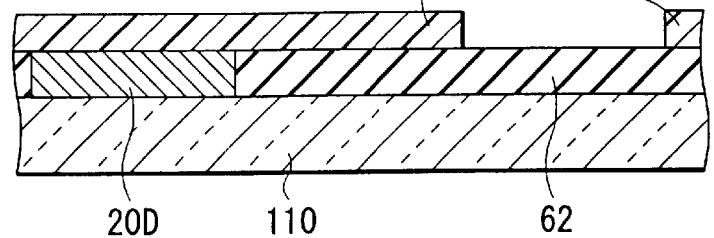
Figure 27A:
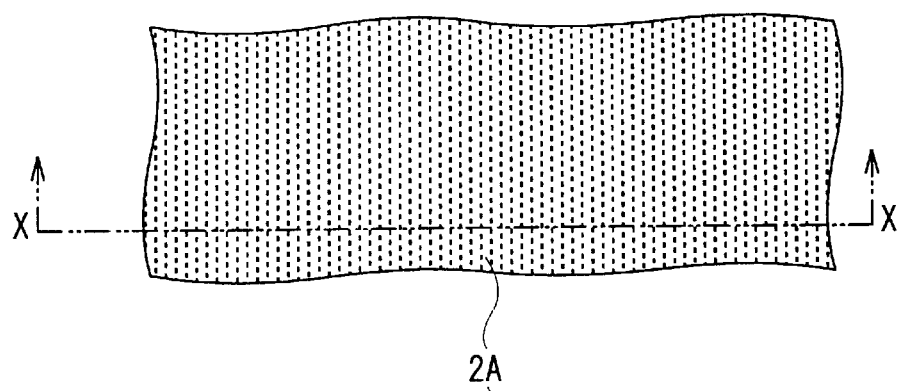
FIGS. 27A and 27B are a plan view and a cross sectional view for describing a step following the step of FIGS. 26A and 26B.
Figure 27B:
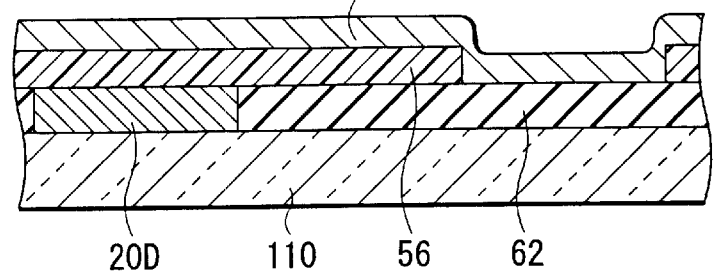

Next, photolithography (a series of steps of forming a photoresist film on the whole surface, selectively performing exposures and carrying out development processing) is carried out, and as shown in FIGS. 26A and 26B, the photoresist film 56 is formed so as to cover the whole surface of the MR film pattern 20D and part of the area of the insulating layer 62. At this time, an aperture 56K is disposed in an area of the photoresist film 56 at a predetermined distance in the width direction (direction parallel to the line x—x line) from the MR film pattern 20D (that is, an area where the dummy resistive film pattern 2 will be formed). The aperture 56K is formed so as to be larger in size than the dummy resistive film pattern 2 to be formed later. Then, as shown in FIGS. 27A and 27B, the dummy resistive film 2A is formed all over the surface area so as to fill in the aperture 56K.

Figure 28A:
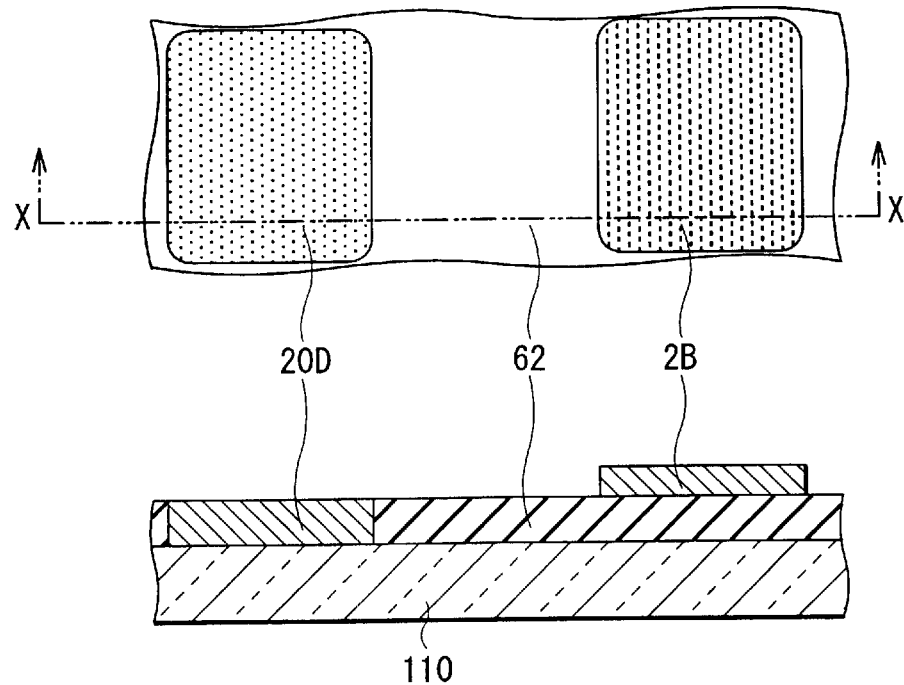
FIGS. 28A and 28B are a plan view and a cross sectional view for describing a step following the step of FIGS. 27A and 27B.
Figure 28B:
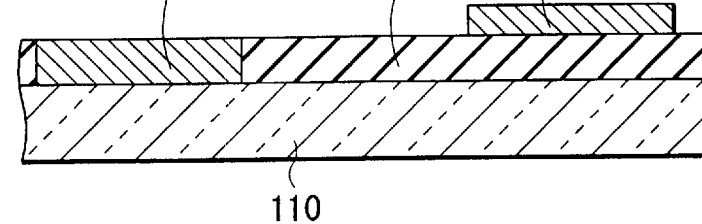
Figure 41A:
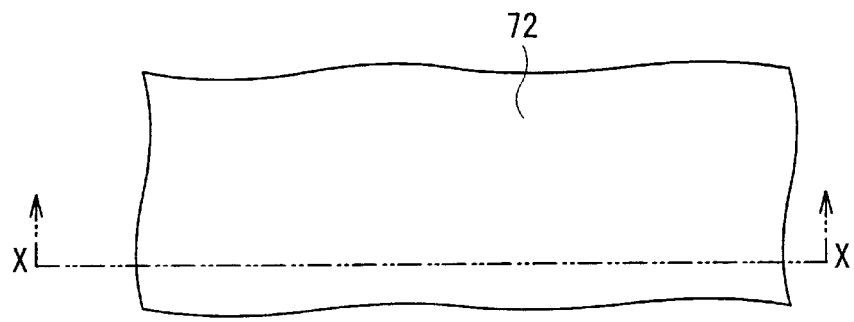
FIGS. 41A and 41B are a plan view and a cross sectional view for describing a step following the step of FIGS. 40A and 40B.
Figure 41B:
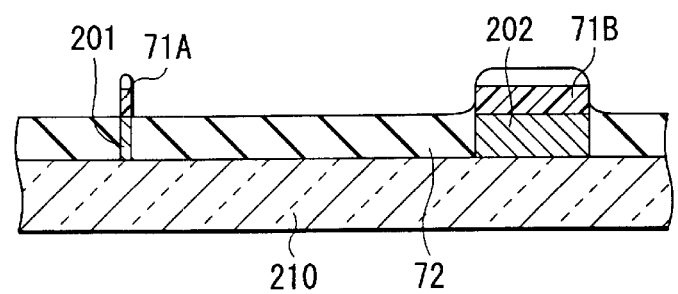
Figure 42A:
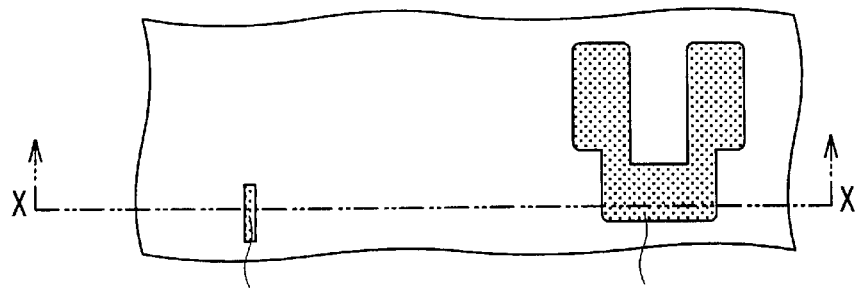
FIGS. 42A and 42B are a plan view and a cross sectional view for describing a step following the step of FIGS. 41A and 41B.
Figure 42B:
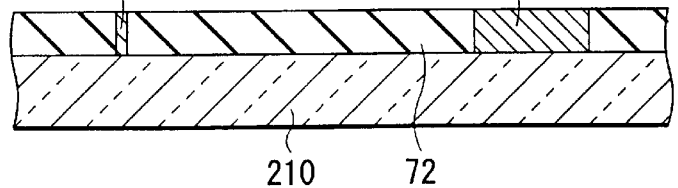

After that, as shown in FIGS. 28A and 28B, the photoresist film 56 and the dummy resistive film 2A thereon are removed through lift off processing. Thereby, the MR film pattern 20D buried in the insulating layer 62 is exposed again. On the other hand, the dummy resistive film pattern 2B formed on the insulating layer 62 is exposed for the first time.

Next, as shown in FIGS. 29A and 29B, while the photoresist pattern 57A is formed on the MR film pattern 20D through photolithography, the photoresist pattern 57B is formed on the dummy resistive film pattern 2B. In this case, the sizes and shapes of and the relative positional relationship between the photoresist patterns 57A and 57B are equivalent to the sizes and shapes of and the relative positional relationship between the photoresist patterns 54A and 54B shown in FIG. 16A in the first embodiment.

In other words, the photoresist pattern 57A (refer to FIGS. 29A and 29B) has, for example, a substantially rectangular shape, and the dimension W2 of the photoresist pattern 57A in the width direction (direction parallel to the line x—x) is sufficiently larger than the width dimension W1 of a MR film pattern 20F (refer to FIGS. 35A and 35B) to be finally formed in the patterning step, and the dimension L2 of the photoresist pattern 57A in the length direction is equal to the dimension L2 of the MR film pattern 20F in the height direction (direction orthogonal to the line x—x).

On the other hand, the photoresist pattern 57B (refer to FIGS. 29A and 29B) is formed in a shape similar to the letter U, and has a portion 57BK extending in the width direction (direction parallel to the line x—x) in the shape of the letter U and pad portions 57BL and 57BR extending from the both sides of the portion 57BK in the height direction. The photoresist pattern 57B has a dimension of approximately from 20 μm to 50 μm in the width direction and a dimension of approximately from 20 μm to 50 μm in the height direction, so the photoresist pattern 57B is sufficiently larger than the photoresist pattern 57A.

The photoresist pattern 57B is formed so as to have a predetermined relative positional relationship between the photoresist patterns 57A and 57B in the height direction. More specifically, the photoresist patterns 57A and 57B are formed so that a distance between a position P1 of a back edge 57AS of the photoresist pattern 57A and a position P2 of a back edge 57BS of the portion 57BK in the photoresist pattern 57B is of a predetermined value d1. In the embodiment, like the first embodiment, the photoresist patterns 57A and 57B are concurrently formed through the same photolithography, so it is easier to keep the value d1 constant with high accuracy.

Next, as shown in FIGS. 30A and 30B, the MR film pattern 20D, the dummy resistive film 2B and the insulating layer 62 are selectively etched and patterned by use of the photoresist patterns 57A and 57B as masks through ion milling or the like. Thereby, the MR film pattern 20E is formed under the photoresist pattern 57A. On the other hand, the dummy resistive film pattern 2 is formed under the photoresist pattern 57B, and an insulating layer 62D is formed under the dummy resistive film pattern 2. At this time, the positional relationship between the MR film pattern 20E and the dummy resistive film pattern 2 is equivalent to the positional relationship between the photoresist patterns 57A and 57B. This will be described in more detail later.

Next, after forming an insulating layer (not shown) on the whole surface area, the photoresist patterns 57A and 57B and the insulating layer thereon are removed through lift off processing to expose the MR film pattern 20E, the insulating layer 63, the dummy resistive film pattern 2, as shown in FIGS. 31A and 31B. Thus, while the MR film pattern 20E of which the surroundings is filled with the insulating layer 63 is formed, and the dummy resistive film pattern 2 is formed on the insulating layer 62D. In this case, a distance in the height direction (direction orthogonal to the polishing surface) between the position P1 of the back edge of the MR film pattern 20E and the position P2 of the back edge of the portion 2K extending in the width direction in the dummy resistive film pattern 2 is held at the constant value d1 with high accuracy.

Next, as shown in FIGS. 32A and 32B, an EB resist film 58 is formed on the whole surface area. Then, as shown in FIGS. 33A and 33B, EB resist patterns 58A and 58B are formed through EB lithography. At this time, the EB resist pattern 58A is formed so as to cross the exposed MR film pattern 20E in the height direction (direction orthogonal to the line x—x) and partly cover the MR film pattern 20E. The dimension W1 of the EB resist pattern 58A in the width direction (direction parallel to the line x—x) determines the dimension of the MR film pattern 20 (refer to FIGS. 2 and 3) in the width direction. On the other hand, the EB resist pattern 58B is formed so as to cover only the whole dummy resistive film pattern 2 and its surroundings. As of the first embodiment, in the embodiment, the use of EB lithography allows more accurate patterning as compared with the photolithography, so the extremely small dimension W1 can be secured.

Next, as shown in FIGS. 34A and 34B, the MR film pattern 20E and the insulating layer 63 are selectively etched by use of the EB resist patterns 58A and 58B as masks through ion milling or the like. Thereby, the MR film pattern 20F is formed under the EB resist pattern 58A, and an insulating layer pattern 63A is formed under the EB resist pattern 58B (the dummy resistive film pattern 2 and the insulating film pattern 62D are already formed in the step shown in FIGS. 30A and 30B). The dimension of the MR film pattern 20F in the width direction is equal to the width dimension W1 of the EB resist pattern 58A, which is the final width dimension of the MR film pattern 20 (refer to FIGS. 2 and 3).

Then, after forming an insulating layer 64 on the whole surface area, as shown in FIGS. 35A and 35B, the EB resist patterns 58A and 58B and the insulating layer 64 disposed thereon are removed through lift off processing to expose the MR film pattern 20F, the dummy resistive film pattern 2 and the insulating layer pattern 63A, as shown in FIGS. 36A and 36B. Thus, the MR film pattern 20F of which the surroundings are filled with the insulating layer 64, etc., and which has the dimension W1 in the width direction (direction parallel to the line x—x) and the dimension L2 in the height direction (direction orthogonal to the line x—x) is formed. At this time, the dummy resistive film pattern 2 is formed on the insulating layer 62D. In addition, the insulating layer including the insulating layers 62D, 63A and 64 corresponds to the insulating layer 14 in FIGS. 2 and 3.

As described above, according to the embodiment, while the patterning step which determines the extremely small dimension W1 of the MR film pattern 20F in the width direction is carried out through EB lithography, a portion of the dimension L2 of the MR film pattern 20F in the height direction and the dummy resistive film pattern 2 are patterned through photolithography. Therefore, as of the first embodiment, efficient patterning in terms of time and accuracy can be carried out.

Moreover, according to the embodiment, the step of patterning which determines the dimension L2 of the MR film pattern 20F in the height direction before polishing and the step of pattering the dummy resistive film pattern 2 are concurrently carried out through photolithography, so the positional relationship between the MR film pattern 20F and the dummy resistive film pattern 2 can be held constant with higher accuracy. In other words, in the step of polishing to form the air bearing surface, even if the polishing amount is controlled by use of the resistance of the dummy resistive film pattern 2 as a measure, like the first embodiment, the MR height h of the completed MR pattern 20 can be held constant with higher accuracy.

Thus, in the embodiment, the patterning step which determines the width dimension W1 of the MR film pattern 20F which can be finally obtained in the patterning step is carried out after the step of patterning a portion of the height dimension L2 of the MR film pattern 20F and the dummy resistive film pattern 2. However, regardless of the order of steps, the effects equal to those of the first embodiment can be obtained.

As described above, the description of the present invention is given referring to the embodiments, however, the invention is not limited to the above embodiments, and is applicable to various modifications. For example, in the above embodiments, the MR film pattern 20 has a strip shape, although any other shapes may be applicable. Further, the dummy resistive film pattern 2 has the shape of the letter U, although any other shapes may be applicable.

Moreover, in the embodiments, the TMR film is described as a specific example of the MR film pattern 20, although the invention does not limited to this, and may applicable to for example, a CIP (current flow-in-the-plane)-GMR such as a spin valve type, a CPP (current perpendicular-to-plane)-GMR film which allows a current to flow in the direction perpendicular to a MR film surface, and so on.

As described above, according to a method of manufacturing a magnetoresistive device of the invention, or a method of manufacturing a thin film magnetic head of the invention, a magnetoresistive film pattern is formed through at least electron beam lithography, so even the magnetoresistive film pattern with an extremely small size can be formed with higher accuracy. Further, as a dummy resistive film is patterned through photolithography, even if the dummy resistive film to be formed has a large size, patterning can be carried out in a shorter time.

Specifically, when electron beam lithography or photolithography is selectively used according to the sizes of patterns to be formed or the dimensions of a portion to be formed, dimensional accuracy of a portion specifically requiring higher accuracy can be secured, and a time required for forming the patterns can be reduced, thereby the patterns can be more efficiently formed, as compared with the case where all of the patterns are formed through electron beam lithography.

When the first outline of the magnetoresistive film and the dummy resistive film are concurrently patterned through photolithography, the displacement between the first outline potion of the magnetoresistive film pattern and the dummy resistive film pattern can be reduced.

When a portion determining the dimension of the magnetoresistive film in the height direction and the dummy resistive film are concurrently patterned through photolithography, the displacement between the position of the magnetoresistive film pattern in the height direction and the position of the dummy resistive film pattern can be reduced, and the dimensional accuracy of the magnetoresistive device in the height direction can be improved.

When a first thin film pattern is formed through at least electron beam lithography, and a second thin film pattern having a larger size than the first thin film pattern is formed through photolithography, accurate patterning can be carried out in an extremely small portion, and a time required for forming the patterns can be further reduced, thereby the patterns can be more efficiently formed, as compared with the case where all of the patterns are formed through electron beam lithography Obviously many modifications and variations of the present invention are possible in the light of the above teachings. It is therefore to be understood that within the scope of the appended claims the invention may be practiced otherwise than as specifically described.

What is claimed is:

1. A method of manufacturing a magnetoresistive device including a magnetoresistive film pattern with a predetermined shape, the method comprising:

a first step of forming a magnetoresistive film on a base;

a second step of patterning the magnetoresistive film through at least electron beam lithography to form the magnetoresistive film pattern;

a third step of forming a dummy resistive film on the base; and a fourth step of patterning the dummy resistive film through photolithography to form a dummy resistive film pattern used for reprocessing the magnetoresistive film pattern.

2. A method of manufacturing a magnetoresistive device according to claim 1, wherein the dummy resistive film pattern has a larger size than the magnetoresistive film pattern.

3. A method of manufacturing a magnetoresistive device according to claim 1, wherein the magnetoresistive film pattern includes a first outline and a second outline, the second outline requiring higher processing accuracy than the first outline or having a smaller size than the first outline, the second step including the steps of:
forming the first outline through patterning by use of photolithography, and
forming the second outline through patterning by use of electron beam lithography.

4. A method of manufacturing a magnetoresistive device according to claim 3, wherein
the step of forming the first outline and the fourth step are concurrently carried out.

5. A method of manufacturing a magnetoresistive device according to claim 4, wherein
the step of forming the second outline is carried out prior to the step of forming the first outline and the fourth step.

6. A method of manufacturing a magnetoresistive device according to claim 4, wherein
the step of forming the first outline and the fourth step are carried out prior to the step of forming the second outline.

7. A method of manufacturing a magnetoresistive device according to claim 1, wherein
the magnetoresistive device is a tunneling magnetoresistive device.

8. A method of manufacturing a thin film magnetic head including a magnetoresistive device having a magnetoresistive film pattern with a predetermined shape disposed on a base, the method comprising:
a first step of forming a magnetoresistive film on the base;
a second step of patterning the magnetoresistive film through at least electron beam lithography to form the magnetoresistive film pattern;
a third step of forming a dummy resistive film on the base;
a fourth step of patterning the dummy resistive film through photolithography to form a dummy resistive film pattern; and
a fifth step of polishing a side surface of the base as well as an end surface of the magnetoresistive film pattern and an end surface of the dummy resistive film pattern to form a recording-medium-facing surface facing a recording medium,
wherein the amount of polishing in the fifth step is controlled based on electrical resistance of the dummy resistive film pattern.

9. A method of manufacturing a thin film magnetic head according to claim 8, wherein the magnetoresistive film pattern has a strip shape determined by a dimension in the width direction defining a recording track width of the recording medium and a dimension in the height direction orthogonal to the width direction, the dimension in the height direction being larger than the dimension in the width direction,
the second step includes the steps of:
determining the dimension in the height direction through patterning by use of photolithography, and
determining the dimension in the width direction through patterning by use of electron beam lithography.

10. A method of manufacturing a thin film magnetic head according to claim 9, wherein the step of determining the dimension in the height direction and the fourth step are concurrently carried out.

11. A method of manufacturing a thin film magnetic head according to claim 10, wherein the step of determining the dimension in the width direction is carried out prior to the step of determining the dimension in the height direction and the fourth step.

12. A method of manufacturing a thin film magnetic head according to claim 10, wherein the step of determining the dimension in the height direction and the fourth step are carried out prior to the step of determining the dimension in the width direction.

13. A method of manufacturing a thin film magnetic head according to claim 8, wherein
the magnetoresistive device is a tunneling magnetoresistive device.

14. A method of forming a thin film pattern, comprising the steps of:
forming a first thin film pattern on a base through at least electron beam lithography; and
forming a second thin film pattern on the base through photolithography, the second thin film pattern being larger than the first thin film pattern.

* * * * *